(12) United States Patent
Sun et al.

(10) Patent No.: US 11,812,423 B2
(45) Date of Patent: *Nov. 7, 2023

(54) SEMI-STATIC TRANSMISSION CONFIGURATION INDICATOR CONFIGURATION

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/528,905

(22) Filed: Nov. 17, 2021

(65) Prior Publication Data

US 2022/0078807 A1    Mar. 10, 2022

Related U.S. Application Data

(63) Continuation of application No. 16/593,828, filed on Oct. 4, 2019, now Pat. No. 11,184,902.

(Continued)

(51) Int. Cl.
*H04W 72/12* (2023.01)
*H04W 72/0446* (2023.01)
(Continued)

(52) U.S. Cl.
CPC .......... *H04W 72/12* (2013.01); *H04B 7/0626* (2013.01); *H04L 1/0006* (2013.01);
(Continued)

(58) Field of Classification Search
CPC ..... H04W 72/12; H04W 76/27; H04W 72/56; H04W 72/23; H04W 72/0446;
(Continued)

(56) References Cited

U.S. PATENT DOCUMENTS

2014/0044108 A1    2/2014  Earnshaw et al.
2015/0180619 A1*   6/2015  Majjigi ................. H04W 72/23
                                              370/330
(Continued)

FOREIGN PATENT DOCUMENTS

CN           108199819 A      6/2018

OTHER PUBLICATIONS

International Search Report and Written Opinion—PCT/US2019/054984—ISA/EPO—dated Jan. 17, 2020.
(Continued)

*Primary Examiner* — Sai Ming Chan
(74) *Attorney, Agent, or Firm* — Holland & Hart LLP

(57) ABSTRACT

Methods, systems, and devices for wireless communications are described. A base station may transmit a configuration indicating a transmission configuration indicator (TCI) state switching pattern and a TCI state switching period to a user equipment (UE). The UE may perform TCI state switching according to the TCI state switching pattern and period, and the UE may receive a downlink transmission according to the TCI state switching pattern. The UE may receive a downlink control information (DCI) including an indication of a TCI state for a subsequent TTI. The UE may receive the downlink signal in accordance with both the TCI state switching pattern and the indication in the DCI. The UE may receive a configuration message indicating a first DCI state, receive a DCI indicating a second TCI state for a subsequent TTI, switch to the second TCI state, and receive a downlink signal using the second TCI state.

30 Claims, 25 Drawing Sheets

Related U.S. Application Data

(60) Provisional application No. 62/742,918, filed on Oct. 8, 2018.

(51) Int. Cl.
*H04L 1/00* (2006.01)
*H04W 76/27* (2018.01)
*H04B 7/06* (2006.01)
*H04W 72/23* (2023.01)
*H04W 72/56* (2023.01)

(52) U.S. Cl.
CPC .......... *H04L 1/0025* (2013.01); *H04L 1/0027* (2013.01); *H04W 72/0446* (2013.01); *H04W 72/23* (2023.01); *H04W 72/56* (2023.01); *H04W 76/27* (2018.02)

(58) Field of Classification Search
CPC ... H04B 7/0626; H04L 1/0006; H04L 1/0025; H04L 1/0027
USPC .......................................................... 370/330
See application file for complete search history.

(56) References Cited

U.S. PATENT DOCUMENTS

| | | | |
|---|---|---|---|
| 2017/0290046 A1* | 10/2017 | Sun | H04W 72/541 |
| 2018/0227886 A1 | 8/2018 | Chou et al. | |
| 2019/0281587 A1* | 9/2019 | Zhang | H04B 7/088 |
| 2020/0015200 A1* | 1/2020 | Vilaipornsawai | H04L 1/1819 |
| 2020/0112974 A1 | 4/2020 | Sun et al. | |

OTHER PUBLICATIONS

Nokia, et al., "Enhancements on Multi-beam Operation," 3GPP Draft, 3GPP TSG RAN WG1 Meeting #94-bis, R1-1811408, 3rd Generation Partnership Project (3GPP), Mobile Competence Centre, 650, Route Des Lucioles, F-06921 Sophia-Antipolis Cedex, France, vol. RAN WG1, Sep. 29, 2018 (Sep. 29, 2018), XP051518812, 13 pages, Retrieved from the Internet: URL: http://www.3gpp.org/ftp/tsg%5Fran/WG1%5FRL1/TSGR1%5F94b/Docs/R1%2D1811408%2Ezip [retrieved on Sep. 29, 2018] Section 2.3; figure 5.

Nokia, et al., "Maintenance for Beam Management," 3GPP Draft, 3GPP TSG RAN WG1 Meeting #94bis, R1-1811404, 3rd Generation Partnership Project (3GPP), Mobile Competence Centre, 650, Route Des Lucioles, F-06921 Sophia-Antipolis Cedex, France, vol. RAN WG1, Sep. 29, 2018 (Sep. 29, 2018), XP051518808, 5 pages, Retrieved from the Internet: URL: http://www.3gpp.org/ftp/tsg%5Fran/WG1%5FRL1/TSGR1%5F94b/Docs/R1%2D1811404%2Ezip [retrieved on Sep. 29, 2018] Section 2.3.

Qualcomm Incorporated: "Beam Management for NR", 3GPP Draft, 3GPP TSG-RAN WG1 Meeting #94bis, R1-1811633, 3rd Generation Partnership Project (3GPP), Mobile Competence Centre, 650, Route Des Lucioles, F-06921, Sophia-Antipolis Cedex, France, vol. RAN WG1, No. Chengdu, China, Oct. 8, 2018-Oct. 12, 2018, Sep. 30, 2018 (Sep. 30, 2018), 13 pages, XP051519027, Retrieved from the Internet: URL: http://www.3gpp.org/ftp/tsg%5Fran/WG1%5FRL1/TSGR1%5F94b/Docs/R1%2D1811633%2Ezip [retrieved on Sep. 30, 2018], the whole document.

\* cited by examiner

First TCI State 420

Second TCI State 425

First TCI State 520

Second TCI State 525

Third TCI State 530

Fourth TCI State 535

SEMI-STATIC TRANSMISSION CONFIGURATION INDICATOR CONFIGURATION

CROSS REFERENCE

The present Application for Patent is a Continuation of U.S. patent application Ser. No. 16/593,828 by SUN et al., entitled "SEMI-STATIC TRANSMISSION CONFIGURATION INDICATOR CONFIGURATION" filed Oct. 4, 2019, which claims the benefit of U.S. Provisional Patent Application No. 62/742,918 by SUN et al., entitled "SEMI-STATIC TRANSMISSION CONFIGURATION INDICATOR CONFIGURATION," filed Oct. 8, 2018, assigned to the assignee hereof, and which is expressly incorporated by reference herein.

BACKGROUND

The following relates generally to wireless communications, and more specifically to semi-static transmission configuration indicator (TCI) configuration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

In conventional wireless communications systems, such as a mmW wireless network, a data transmission (e.g., physical downlink shared channel (PDSCH)) or a control transmission (a physical downlink control channel (PDCCH)), or the like may be transmitted by a base station using a TCI state (e.g., corresponding to a beamformed transmission) to a UE. The UE may use information about the TCI state to configure receivers of the UE to receive the beamformed transmission. In some examples, beams may be wholly or partially blocked (e.g., such as by a person walking in front of the UE, a user switching their grip on the UE, and the like), degrading performance. Changing a TCI state used by the UE in response may improve reception performance, but conventional TCI state switching may be slow, require undesired overhead, or otherwise be insufficient or inefficient.

SUMMARY

The described techniques relate to improved methods, systems, devices, and apparatuses that support semi-static transmission configuration indicator (TCI) configuration. In some cases, performing TCI state switching according to a pattern may support macro-diversity for a downlink transmissions. A base station may send a configuration message to a user equipment (UE) and the configuration may indicate a TCI state switching pattern and a TCI state switching period including a number of transmission time intervals (TTIs). The TCI state switching pattern may indicate a TCI for each TTI of the TCI period. The UE may receive the configuration (e.g., via radio resource control (RRC) signaling or medium access control (MAC) control element (CE)) and may perform TCI state switching based on the TCI pattern (e.g., may adjust one or more antenna ports or antenna panels to receive a downlink signal based on the TCI states of the TCI pattern). In some examples, the UE may also receive a downlink control information (DCI) including a grant, and the grant may indicate resources for a downlink signal across a set of aggregated TTIs. The UE may receive the downlink signal during the aggregated TTIs, by performing TCI state switching based on the TCI state pattern. Performing TCI state switching based on the TCI state pattern, instead of waiting to perform TCI state switching until a subsequent aggregated TTI, may improve system latency and efficiency. In some examples, the DCI may also indicate a TCI state for TTIs located more than a threshold number of TTIs from the TTI in which the DCI is received. In such examples, the UE may perform TCI state switching for the indicated TTI based on the DCI, instead of based on the configured TCI state pattern. If the UE does not receive another DCI indicating TCI states for identified TTIs, the UE may revert to performing TCI state switching for downlink signals based on the TCI state pattern after an amount of time has passed (e.g., after a preconfigured timer expires). In some cases, the DCI may indicate one or more TCI state for TTIs that are subsequent to a known offset (e.g., a known number of TTIs), and may not indicate any TCI states for TTIs that are within the known offset. This may decrease signaling overhead, improving system efficiency.

In some cases, performing TCI state switching based on a received DCI may improve system latency. A UE may receive one or more downlink signals using a first TCI state (e.g., a first configuration of antenna ports or antenna panels for receiving downlink signals) that corresponds to a beam. The UE may receive a configuration message indicating the first TCI state (e.g., via RRC signaling) or may be preconfigured with a default TCI state, or the like. The UE may receive a DCI including a downlink grant indicating resources for a downlink signal. The DCI may also indicate a second TCI state for receiving part of the downlink signal. The UE may receive a first portion of the downlink signal during one or more TTIs according to the first TCI state. The UE may then switch from the first TCI state to the second TCI state to receive the second portion of the downlink signal. In some examples, the TCI switch may occur after a known offset (e.g., a known number of TTIs). Performing TCI state switching within the aggregated TTI may be faster than waiting to perform TCI state switching after a subsequent configuration message, which may improve system latency. In some cases, the DCI may indicate one or more TCI states for TTIs that are subsequent to the known offset, and may not indicate any TCI states for TTIs that are within the known offset. This may decrease signaling overhead, improving system efficiency.

A method of wireless communication at a UE is described. The method may include receiving a configuration indicating a TCI state switching pattern and a TCI state switching period, the TCI state switching period indicating a number of a set of TTIs, and the TCI state switching pattern indicating a TCI state for each of the set of TTIs, performing, by the UE, TCI state switching according to the TCI state switching pattern and the TCI state switching period, and receiving a downlink transmission during at least one of the set of TTIs of the TCI state switching pattern.

An apparatus for wireless communication at a UE is described. The apparatus may include a processor, memory in electronic communication with the processor, and instructions stored in the memory. The instructions may be executable by the processor to cause the apparatus to receive a configuration indicating a TCI state switching pattern and a TCI state switching period, the TCI state switching period indicating a number of a set of TTIs, and the TCI state switching pattern indicating a TCI state for each of the set of TTIs, perform, by the UE, TCI state switching according to the TCI state switching pattern and the TCI state switching period, and receive a downlink transmission during at least one of the set of TTIs of the TCI state switching pattern.

Another apparatus for wireless communication at a UE is described. The apparatus may include means for receiving a configuration indicating a TCI state switching pattern and a TCI state switching period, the TCI state switching period indicating a number of a set of TTIs, and the TCI state switching pattern indicating a TCI state for each of the set of TTIs, performing, by the UE, TCI state switching according to the TCI state switching pattern and the TCI state switching period, and receiving a downlink transmission during at least one of the set of TTIs of the TCI state switching pattern.

A non-transitory computer-readable medium storing code for wireless communication at a UE is described. The code may include instructions executable by a processor to receive a configuration indicating a TCI state switching pattern and a TCI state switching period, the TCI state switching period indicating a number of a set of TTIs, and the TCI state switching pattern indicating a TCI state for each of the set of TTIs, perform, by the UE, TCI state switching according to the TCI state switching pattern and the TCI state switching period, and receive a downlink transmission during at least one of the set of TTIs of the TCI state switching pattern.

Some examples of the method, apparatuses, and non-transitory computer-readable medium described herein may further include operations, features, means, or instructions for receiving, according to a first TCI state during a first TTI of the TCI state switching pattern, a DCI signal that includes a grant of resources for the downlink transmission and an indication to switch, for a second TTI of the TCI state switching pattern, to a second TCI state different from a TCI state indicated by the TCI state switching pattern for the second TTI, where.

In some examples of the method, apparatuses, and non-transitory computer-readable medium described herein, receiving the downlink transmission may include operations, features, means, or instructions for receiving the downlink transmission according to the grant of resources during at least the first TTI according to the first TCI state and during the second TTI according to the second TCI state, where the downlink transmission may be aggregated over at least the first TTI and the second TTI.

In some examples of the method, apparatuses, and non-transitory computer-readable medium described herein, the downlink transmission includes a single-TTI transmission.

In some examples of the method, apparatuses, and non-transitory computer-readable medium described herein, the TCI state switching pattern may include operations, features, means, or instructions for receiving, using the first antenna port according to the first TCI state and using the second antenna port according to the second TCI state, the downlink transmission during at least one of the set of TTIs of the TCI state switching pattern.

Some examples of the method, apparatuses, and non-transitory computer-readable medium described herein may further include operations, features, means, or instructions for identifying a second configuration indicating a second TCI state switching pattern and a second TCI state switching period and receiving a downlink control information signal according to the identified second configuration, where the downlink transmission received during the at least one of the set of TTIs of the TCI state switching pattern includes a downlink data transmission.

In some examples of the method, apparatuses, and non-transitory computer-readable medium described herein, receiving the configuration may include operations, features, means, or instructions for receiving the configuration in RRC signaling that indicates the TCI state switching pattern and the TCI state switching pattern.

In some examples of the method, apparatuses, and non-transitory computer-readable medium described herein, the configuration in the RRC signaling further includes an indication of an aggregation mode and an indication of a number of TTIs aggregated in a TTI aggregation period for the aggregation mode.

Some examples of the method, apparatuses, and non-transitory computer-readable medium described herein may further include operations, features, means, or instructions for receiving, according to a first TCI state during a first TTI of the TCI state switching pattern, a DCI signal that includes an indication to switch, for a second TTI of the TCI state switching pattern, to a second TCI state different from a TCI state indicated by the TCI state switching pattern for the second TTI, performing TCI state switching based on the indication to switch of the received DCI signal and reverting, after a time duration, to performing TCI state switching according to the TCI state switching pattern.

Some examples of the method, apparatuses, and non-transitory computer-readable medium described herein may further include operations, features, means, or instructions for receiving a DCI signal that indicates a TCI state table, identifying a first set of TCI state entries in the TCI state table that correspond to TTIs that may be located less than a threshold number of TTIs from the first TTI, identifying a second set of TCI state entries in the TCI state table that correspond to TTIs that may be located more than the threshold number of TTIs away from the first TTI and ignoring the first set of TCI state entries, where performing TCI state switching may be based on the identified second set of TCI state entries.

Some examples of the method, apparatuses, and non-transitory computer-readable medium described herein may further include operations, features, means, or instructions for receiving a DCI signal that indicates a TCI state table and identify one or more TCI state entries in the TCI state table that correspond to TTIs that may be more than a threshold number of TTIs from the first TTI, the TCI state table lacking TCI state entries corresponding to TTIs that may be less than the threshold number of TTIs from the first TTI, where performing TCI state switching may be based on the identified one or more TCI state entries.

In some examples of the method, apparatuses, and non-transitory computer-readable medium described herein, a number of different TCI states in the TCI state switching pattern may be equal to a number of TTIs in the set of TTIs of the TCI state switching period.

A method of wireless communication at a UE is described. The method may include receiving a configuration indicating a first TCI state for the UE to use to receive downlink signals, receiving, in a first TTI according to the first TCI state indicated by the received configuration, a DCI signal indicating a second TCI state, the first TTI being one of a set of TTIs aggregated in a TTI aggregation period, switching, responsive to the received DCI signal, to the indicated second TCI state for a second TTI of the set of TTIs aggregated in the TTI aggregation period, and receiving a downlink signal in the second TTI according to the second TCI state.

An apparatus for wireless communication at a UE is described. The apparatus may include a processor, memory in electronic communication with the processor, and instructions stored in the memory. The instructions may be executable by the processor to cause the apparatus to receive a configuration indicating a first TCI state for the UE to use to receive downlink signals, receive, in a first TTI according to the first TCI state indicated by the received configuration, a DCI signal indicating a second TCI state, the first TTI being one of a set of TTIs aggregated in a TTI aggregation period, switch, responsive to the received DCI signal, to the indicated second TCI state for a second TTI of the set of TTIs aggregated in the TTI aggregation period, and receive a downlink signal in the second TTI according to the second TCI state.

Another apparatus for wireless communication at a UE is described. The apparatus may include means for receiving a configuration indicating a first TCI state for the UE to use to receive downlink signals, receiving, in a first TTI according to the first TCI state indicated by the received configuration, a DCI signal indicating a second TCI state, the first TTI being one of a set of TTIs aggregated in a TTI aggregation period, switching, responsive to the received DCI signal, to the indicated second TCI state for a second TTI of the set of TTIs aggregated in the TTI aggregation period, and receiving a downlink signal in the second TTI according to the second TCI state.

A non-transitory computer-readable medium storing code for wireless communication at a UE is described. The code may include instructions executable by a processor to receive a configuration indicating a first TCI state for the UE to use to receive downlink signals, receive, in a first TTI according to the first TCI state indicated by the received configuration, a DCI signal indicating a second TCI state, the first TTI being one of a set of TTIs aggregated in a TTI aggregation period, switch, responsive to the received DCI signal, to the indicated second TCI state for a second TTI of the set of TTIs aggregated in the TTI aggregation period, and receive a downlink signal in the second TTI according to the second TCI state.

In some examples of the method, apparatuses, and non-transitory computer-readable medium described herein, the received configuration further indicates a TCI state switching pattern and a TCI state switching period, the TCI state switching period indicating a number of a set of TTIs, and the TCI state switching pattern indicating a TCI state for each of the set of TTIs, including the first TCI state for the first TTI.

Some examples of the method, apparatuses, and non-transitory computer-readable medium described herein may further include operations, features, means, or instructions for identifying a first set of TCI state entries in a TCI state table that may be indicated by the received DCI signal, the first set of TCI state entries corresponding to TTIs that may be located less than a threshold number of TTIs from the first TTI, identifying a second set of TCI state entries in the TCI state table that correspond to TTIs that may be located more than the threshold number of TTIs away from the first TTI, ignoring the first set of TCI state entries, where and switching to the indicated second TCI state may be based on the identified second set of TCI state entries.

Some examples of the method, apparatuses, and non-transitory computer-readable medium described herein may further include operations, features, means, or instructions for identifying one or more TCI state entries in a TCI state table that may be indicated by the received DCI signal, the one or more TCI states corresponding to TTIs that may be more than a threshold number of TTIs from the first TTI, and the TCI state table lacks TCI state entries corresponding to TTIs that may be less than the threshold number of TTIs from the first TTI, where and switching to the indicated second TCI state may be based on the identified one or more TCI state entries.

In some examples of the method, apparatuses, and non-transitory computer-readable medium described herein, receiving the configuration may include operations, features, means, or instructions for receiving the configuration in RRC signaling that indicates the first TCI state for the UE to use to receive downlink signals.

In some examples of the method, apparatuses, and non-transitory computer-readable medium described herein, the configuration in the RRC signaling further includes an indication of an aggregation mode and an indication of a number of TTIs aggregated in the TTI aggregation period for the aggregation mode.

Some examples of the method, apparatuses, and non-transitory computer-readable medium described herein may further include operations, features, means, or instructions for performing, prior to receiving the DCI signal indicating the second TCI state, TCI state switching according to a first TCI state switching pattern, performing, for a predetermined time duration, TCI state switching responsive to the received DCI signal and reverting, after the predetermined time duration, to performing TCI state switching according to the first TCI state switching pattern based on identifying that a second DCI signal may have not been received during the predetermined time duration.

A method of wireless communication at a base station is described. The method may include identifying a TCI state switching pattern and a TCI state switching period, the TCI state switching period indicating a number of a set of TTIs, and the TCI state switching pattern indicating a TCI state for each of the set of TTIs, transmitting, to a UE, a configuration indicating the identified TCI state switching pattern and the identified TCI state switching period, and transmitting a downlink transmission to the UE during at least one of the set of TTIs according to the TCI state switching pattern and the TCI state switching period.

An apparatus for wireless communication at a base station is described. The apparatus may include a processor, memory in electronic communication with the processor, and instructions stored in the memory. The instructions may be executable by the processor to cause the apparatus to identify a TCI state switching pattern and a TCI state switching period, the TCI state switching period indicating a number of a set of TTIs, and the TCI state switching pattern indicating a TCI state for each of the set of TTIs, transmit, to a UE, a configuration indicating the identified TCI state switching pattern and the identified TCI state switching period, and transmit a downlink transmission to the UE during at least one of the set of TTIs according to the TCI state switching pattern and the TCI state switching period.

Another apparatus for wireless communication at a base station is described. The apparatus may include means for identifying a TCI state switching pattern and a TCI state switching period, the TCI state switching period indicating a number of a set of TTIs, and the TCI state switching pattern indicating a TCI state for each of the set of TTIs, transmitting, to a UE, a configuration indicating the identified TCI state switching pattern and the identified TCI state switching period, and transmitting a downlink transmission to the UE during at least one of the set of TTIs according to the TCI state switching pattern and the TCI state switching period.

A non-transitory computer-readable medium storing code for wireless communication at a base station is described. The code may include instructions executable by a processor to identify a TCI state switching pattern and a TCI state switching period, the TCI state switching period indicating a number of a set of TTIs, and the TCI state switching pattern indicating a TCI state for each of the set of TTIs, transmit, to a UE, a configuration indicating the identified TCI state switching pattern and the identified TCI state switching period, and transmit a downlink transmission to the UE during at least one of the set of TTIs according to the TCI state switching pattern and the TCI state switching period.

Some examples of the method, apparatuses, and non-transitory computer-readable medium described herein may further include operations, features, means, or instructions for transmitting, according to a first TCI state during a first TTI of the TCI state switching pattern, a DCI signal that includes a grant of resources for the downlink transmission and an indication for the UE to switch, for a second TTI of the TCI state switching pattern, to a second TCI state different from a TCI state indicated by the TCI state switching pattern for the second TTI, where.

In some examples of the method, apparatuses, and non-transitory computer-readable medium described herein, transmitting the downlink transmission may include operations, features, means, or instructions for transmitting the downlink transmission according to the grant of resources during at least the first TTI according to the first TCI state and during the second TTI according to the second TCI state, where the downlink transmission may be aggregated over at least the first TTI and the second TTI.

In some examples of the method, apparatuses, and non-transitory computer-readable medium described herein, the downlink transmission includes a single-TTI transmission.

In some examples of the method, apparatuses, and non-transitory computer-readable medium described herein, the TCI state switching pattern includes a first TCI state associated with a first antenna port for each of the set of TTIs and a second TCI state associated with a second antenna port for each of the set of TTIs, the UE to receive the downlink transmission using the first antenna port according to the first TCI state and using the second antenna port according to the second TCI state, the downlink transmission during at least one of the set of TTIs of the TCI state switching pattern.

Some examples of the method, apparatuses, and non-transitory computer-readable medium described herein may further include operations, features, means, or instructions for identifying a second configuration indicating a second TCI state switching pattern and a second TCI state switching period, transmitting, to the UE, an indication of the second configuration and transmitting, to the UE, a downlink control information signal according to the identified second configuration, where the downlink transmission transmitted to the UE during the at least one of the set of TTIs according to the TCI state switching pattern and the TCI state switching period includes a downlink data transmission.

In some examples of the method, apparatuses, and non-transitory computer-readable medium described herein, transmitting the configuration may include operations, features, means, or instructions for transmitting the configuration in RRC signaling that indicates the TCI state switching pattern and the TCI state switching pattern.

In some examples of the method, apparatuses, and non-transitory computer-readable medium described herein, the configuration in the RRC signaling further includes an indication of an aggregation mode and an indication of a number of TTIs aggregated in a TTI aggregation period for the aggregation mode.

Some examples of the method, apparatuses, and non-transitory computer-readable medium described herein may further include operations, features, means, or instructions for transmitting, according to a first TCI state during a first TTI of the TCI state switching pattern, a DCI signal that includes an indication for the UE to switch, for a second TTI of the TCI state switching pattern, to a second TCI state different from a TCI state indicated by the TCI state switching pattern for the second TTI, and for the UE to revert, after a time duration, to performing TCI state switching according to the TCI state switching pattern.

Some examples of the method, apparatuses, and non-transitory computer-readable medium described herein may further include operations, features, means, or instructions for transmitting a DCI signal that indicates a TCI state table, the TCI including a first set of TCI state entries that correspond to TTIs that may be located less than a threshold number of TTIs from the first TTI, and including a second set of TCI state entries that correspond to TTIs that may be located more than the threshold number of TTIs away from the first TTI, the UE to ignore the first set of TCI state entries when performing TCI state switching based on the identified second set of TCI state entries.

Some examples of the method, apparatuses, and non-transitory computer-readable medium described herein may further include operations, features, means, or instructions for transmitting a DCI signal that indicates a TCI state table, one or more TCI state entries in the TCI state table corresponding to TTIs that may be more than a threshold number of TTIs from the first TTI, and the TCI state table lacking TCI state entries corresponding to TTIs that may be less than the threshold number of TTIs from the first TTI.

In some examples of the method, apparatuses, and non-transitory computer-readable medium described herein, a number of different TCI states in the TCI state switching pattern may be equal to a number of TTIs in the set of TTIs of the TCI state switching period.

A method of wireless communication at a base station is described. The method may include transmitting, to a UE, a configuration indicating a first TCI state for the UE to use to receive downlink signals, transmitting, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period, and transmitting a downlink signal in the second TTI.

An apparatus for wireless communication at a base station is described. The apparatus may include a processor, memory in electronic communication with the processor, and instructions stored in the memory. The instructions may be executable by the processor to cause the apparatus to transmit, to a UE, a configuration indicating a first TCI state for the UE to use to receive downlink signals, transmit, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period, and transmit a downlink signal in the second TTI.

Another apparatus for wireless communication at a base station is described. The apparatus may include means for transmitting, to a UE, a configuration indicating a first TCI state for the UE to use to receive downlink signals, transmitting, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period, and transmitting a downlink signal in the second TTI.

A non-transitory computer-readable medium storing code for wireless communication at a base station is described. The code may include instructions executable by a processor to transmit, to a UE, a configuration indicating a first TCI state for the UE to use to receive downlink signals, transmit, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period, and transmit a downlink signal in the second TTI.

In some examples of the method, apparatuses, and non-transitory computer-readable medium described herein, the transmitted configuration further indicates a TCI state switching pattern and a TCI state switching period, the TCI state switching period indicating a number of a set of TTIs, and the TCI state switching pattern indicating a TCI state for each of the set of TTIs, including the first TCI state for the first TTI.

Some examples of the method, apparatuses, and non-transitory computer-readable medium described herein may further include operations, features, means, or instructions for identifying a first set of TCI state entries for a TCI state table, the first set of TCI state entries corresponding to TTIs that may be located less than a threshold number of TTIs from the first TTI, identifying a second set of TCI state entries for the TCI state table that correspond to TTIs that may be located more than the threshold number of TTIs away from the first TTI and transmitting, to the UE, an indication of the TCI state table in the DCI signal, the UE to ignore the first set of TCI state entries when switching to the indicated second TCI state based on the second set of TCI state entries.

Some examples of the method, apparatuses, and non-transitory computer-readable medium described herein may further include operations, features, means, or instructions for identifying one or more TCI state entries for a TCI state table, the one or more TCI states corresponding to TTIs that may be more than a threshold number of TTIs from the first TTI, the TCI state table lacking TCI state entries corresponding to TTIs that may be less than the threshold number of TTIs from the first TTI and transmitting, to the UE, an indication of the TCI state table in the DCI signal.

In some examples of the method, apparatuses, and non-transitory computer-readable medium described herein, transmitting the configuration may include operations, features, means, or instructions for transmitting the configuration in RRC signaling that indicates the first TCI state for the UE to use to receive downlink signals.

In some examples of the method, apparatuses, and non-transitory computer-readable medium described herein, the configuration in the RRC signaling further includes an indication of an aggregation mode and an indication of a number of TTIs aggregated in the TTI aggregation period for the aggregation mode.

In some examples of the method, apparatuses, and non-transitory computer-readable medium described herein, transmitting the configuration further may include operations, features, means, or instructions for transmitting an indication for the UE to revert, after a predetermined time duration, to performing TCI state switching according to a first TCI state switching pattern based on identifying that a second DCI signal may have not been received during the predetermined time duration.

DETAILED DESCRIPTION

Figure 1:
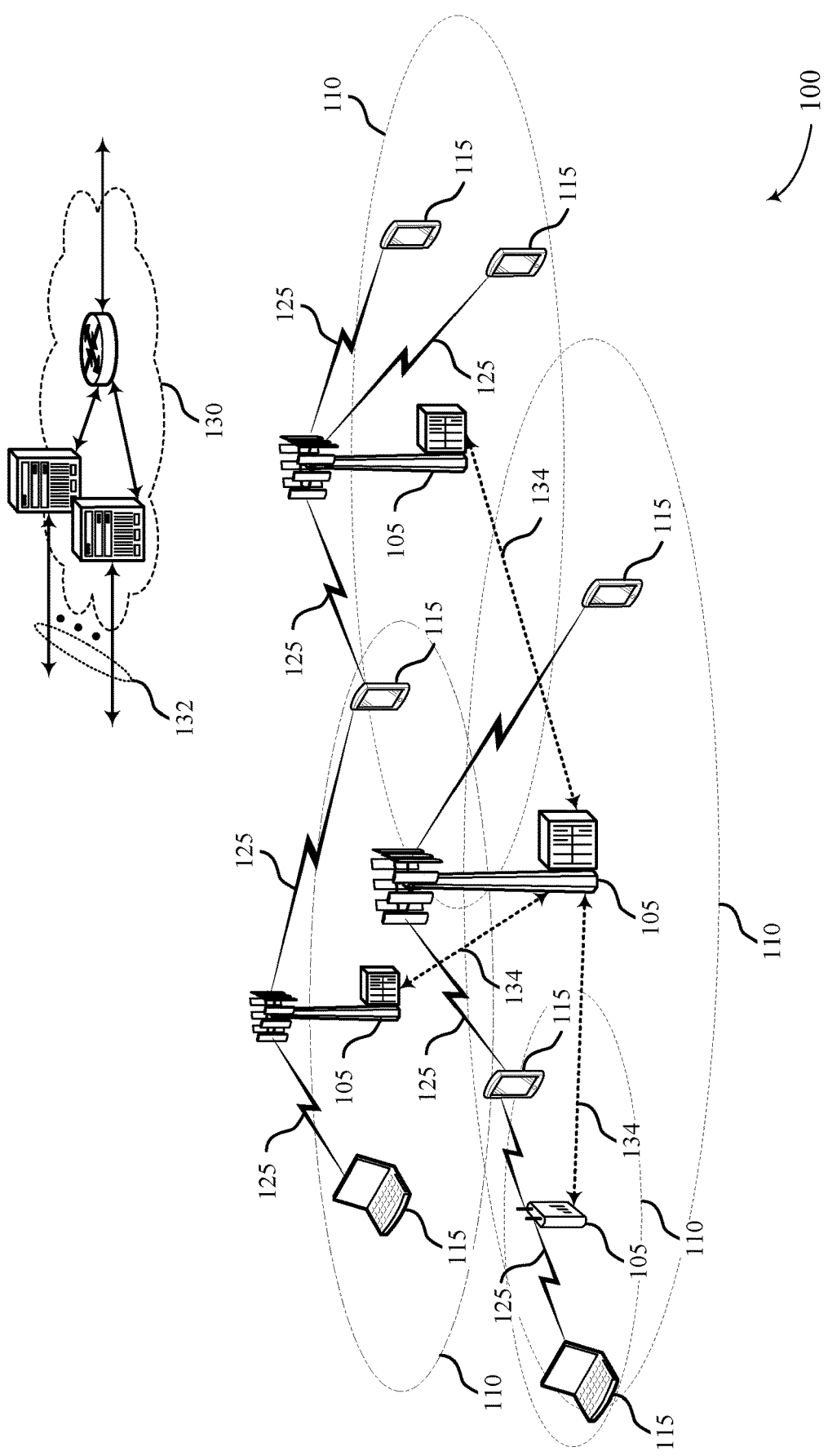
FIG. 1 illustrates an example of a system for wireless communications that supports semi-static transmission configuration indicator (TCI) configuration in accordance with aspects of the present disclosure.

In some examples, a base station and a user equipment (UE) may perform wireless communications. In some examples of a wireless communication system the base station and one or more UEs may communicate on one or more frequency bands (e.g., a first frequency band (FR1) or a second frequency band (FR2)). FR1 may refer to a sub 6 GHz band and FR2 may refer to a band that is above 6 GHz. The base station and the UE may communicate via multiple beamformed transmissions (e.g., multiple transmission configuration indicator (TCI) states) on a frequency band (e.g., FR2). By using multiple TCI states, wireless communications may be improved by decreasing the impact of one or more blocked channels (e.g., wholly or partially blocked such as by a person walking in front of the UE, a user switching their grip on the UE, and the like).

In some examples, transmission time interval (TTI) aggregation (e.g., slot aggregation or mini-slot aggregation) may support macro diversity. For example, a number of TTIs may be aggregated, and different TCI states may be used for communications in the aggregated TTI. In some examples, each TTI may use a different TCI state. In other examples, different combination of TCIs states and TTIs of the aggregated TTI (e.g., slot or mini-slot) may be used. A TCI switching point may occur at TTI boundaries, so that a receiving device (e.g., a UE) may receive downlink signals according to different receiver configurations corresponding to the different beams (e.g., for the different TCI states) in different TTIs. A UE may receive an indication to switch TCI states, or otherwise determine to switch TCI states, but the UE may require some amount of time between receiving such command or making such determining and performing the TCI switching. The time duration may be referred to as a TCI switching capability window. If a requested TCI switching point falls within the TCI switching capability window, then the UE may be unable to perform the TCI switching as commanded. For instance, a UE may require two slots (e.g., TTIs) to receive a PDSCH, decode the received PDSCH, identify a target TCI state for a TTI, and perform the TCI state switch (e.g., a TCI switching capability window of two TTIs). In such examples, the UE may receive a DCI including a downlink grant and a TCI state for a set of aggregated TTIs in a first TTI. Given the TCI switching capability window of two TTIs, the UE will be unable to perform TCI switching for at least two TTIs following the first TTI. If the DCI including TCI states for the first, second, and third TTIs of the set of aggregated TTIs, the UE may be unable to perform the TCI switching (or receive data transmissions during those TTIs).

If the UE does not perform TCI switching during the TCI switching capability window, then macro diversity may be decreased. If the UE receives a cross slot grant where the granted resources are scheduled in TTIs subsequent to the TCI switching capability window (e.g., to allow TCI state switching after the TCI switching capability window), then the downlink transmission will be delayed, resulting in increased latency and decreased user experience.

In some examples, a base station may trigger TCI switching via a configured (e.g., via RRC signaling or a MAC CE) TCI switching period and TCI switching pattern. The RRC configured TCI switching pattern may include a pattern of TCI states across a set of TTIs within the TCI switching period. The TCI switching pattern may be independent from DCI signaling. The UE may switch between TCI states based on the TCI switching pattern, regardless of TCI switching indicated in a DCI, without any TCI switching indicated in a DCI, or in combination with TCI switching indicated in a DCI.

In some examples, the UE may receive an RRC message indicating the TCI switching pattern and the TCI switching period. During the TCI switching period, the UE may receive any downlink signals according to the TCI switching pattern. If the UE receives a downlink grant, the UE may configure a TCI state for each TTI of the granted resources according to the TCI switching pattern. In some cases, the UE may ignore an indication in the DCI of TCI states for TTIs of the granted resources, and may instead perform TCI state switching based on the RRC configured TCI switching pattern. In some examples, the DCI may not contain any indication of TCI switching, and the UE may perform TCI state switching based on the RRC configured TCI switching pattern.

In some examples, the UE may perform TCI switching based on a combination of the RRC configured TCI switching pattern and TCI switching indicated in a DCI. For instance, the UE may receive an RRC message including the TCI switching pattern for a TCI switching period. The UE may receive a DCI including a downlink grant and a TCI switching pattern for a set of aggregated TTIs within the TCI switching period. In some cases, the UE may ignore the DCI configured TCI switching pattern for TCI states within the TCI switching capability window, and may instead perform TCI switching according to the RRC configured TCI switching pattern during the TCI switching capability window. However, following the TCI capability switching window, the UE may perform TCI state switching based on the DCI configured TCI switching pattern. In some examples, the DCI configured switching pattern may only include TCI switching for TTIs outside of the TCI capability switching window. After the DCI configured TCI switching pattern expires (e.g., after expiration of a timer having a known or predetermined time duration), the UE may revert to using the RRC configured TCI switching pattern.

In some examples, the RRC configured switching pattern may include a first portion and a second portion. The first portion may apply to a first antenna port or panel at the UE (and may be a first TCI switching pattern), and the second portion may apply to a second antenna port or panel at the UE (and may be a second TCI switching pattern). The UE may receive data transmissions via the first antenna port based on the first portion (or first pattern), and may receive data transmissions via the second antenna port based on the second portion (or second pattern).

In some cases, the UE may receive single TTI (e.g., single slot) communications, and the base station may indicate a change from the RRC configured TCI pattern for subsequent TTIs. For example, the base station may identify a beam (e.g., a TCI state) that has faded or otherwise is no longer preferred. In such examples, the base station may send a DCI during a TTI that is configured to receive in a preferred TCI state. The DCI may include a cross-TTI grant for a subsequent TTI that is outside of the TCI switching capability window, and an indication to switch a TCI state from the RRC configured TCI pattern (where the TTI is configured with the non-preferred TCI state) to a different TCI state for the TTI.

In some cases, performing TCI state switching within a TTI aggregation based on a received DCI (instead of waiting for a subsequent configuration message) may improve system latency. A UE may receive one or more downlink signals using a first TCI state that corresponds to a first beam. The UE may receive a configuration message indicating the first TCI state (e.g., via RRC signaling) or may be preconfigured with a default TCI state, or the like. The UE may receive a DCI including a downlink grant indicating resources for a downlink signal. The DCI may also indicate a second TCI state for receiving part of the downlink signal within the aggregated TTI. The UE may receive a first portion of the downlink signal during one or more TTIs according to the first TCI state. The UE may then switch from the first TCI state to the second TCI state to receive the second portion of the downlink signal. In some examples, the TCI switch may occur after a known offset (e.g., a known number of TTIs). Performing TCI state switching within the aggregated TTI may be faster than waiting to perform TCI state switching after a subsequent configuration message, which may improve system latency. In some cases, the DCI may indicate one or more TCI state for TTIs that are subsequent to the known offset, and may not indicate any TCI states for TTIs that are within the known offset. This may decrease signaling overhead, improving system efficiency.

Particular aspects of the subject matter described herein may be implemented to realize one or more advantages. The described techniques may support improvements in TCI state switching, decreasing signaling overhead, and improving reliability, among other advantages. As such, supported techniques may include improved network operations and, in some examples, may promote network efficiencies, among other benefits.

Aspects of the disclosure are initially described in the context of a wireless communications system. Aspects of the disclosure are further illustrated by and described with reference to TCI state switching schemes, and process flows. Aspects of the disclosure are further illustrated by and described with reference to apparatus diagrams, system diagrams, and flowcharts that relate to semi-static TCI configuration.

FIG. 1 illustrates an example of a wireless communications system 100 that supports semi-static TCI configuration in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, (e.g., in the range of 300 MHz to 300 GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiple access (OFDMA) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may contain one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may contain one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, performing TCI state switching according to a pattern may support macro-diversity for a downlink transmissions. A base station may send a configuration message to a UE 115 and the configuration may indicate a TCI state switching pattern and a TCI state switching period including a number of TTIs. The TCI state switching pattern may indicate a TCI for each TTI of the TCI period. The UE 115 may receive the configuration (e.g., via RRC signaling) and may perform TCI state switching based on the TCI pattern (e.g., may adjust one or more antenna ports or antenna panels to receive a downlink signal based on the TCI states of the TCI pattern). In some examples, the UE 115 may also receive a DCI including a grant, and the grant may indicate resources for a downlink signal across a set of aggregated TTIs. The UE 115 may receive the downlink signal during the aggregated TTIs, by performing TCI state switching based on the TCI state pattern. Performing TCI state switching based on the TCI state pattern, instead of waiting to perform TCI state switching until a subsequent aggregated TTI, may improve system latency and efficiency. In some examples, the DCI may also indicate a TCI state for TTIs located more than a threshold number of TTIs from the TTI in which the DCI is received. In such examples, the UE 115 may perform TCI state switching for the indicated TTI based on the DCI, instead of based on the configured TCI state pattern. If the UE 115 does not receive another DCI indicating TCI states for identified TTIs, the UE 115 may revert to performing TCI state switching for downlink signals based on the TCI state pattern after an amount of time has passed (e.g., after a preconfigured timer expires). In some cases, the DCI may indicate one or more TCI state for TTIs that are subsequent to a known offset (e.g., a known number of TTIs), and may not indicate any TCI states for TTIs that are within the known offset. This may decrease signaling overhead, improving system efficiency.

In some cases, performing TCI state switching based on a received DCI may improve system latency. A UE 115 may receive one or more downlink signals using a first TCI state (e.g., a first configuration of antenna ports or antenna panels for receiving downlink signals) that corresponds to a beam. The UE 115 may receive a configuration message indicating the first TCI state (e.g., via RRC signaling) or may be preconfigured with a default TCI state, or the like. The UE 115 may receive a DCI including a downlink grant indicating resources for a downlink signal. The DCI may also indicate a second TCI state for receiving part of the downlink signal. The UE 115 may receive a first portion of the downlink signal during one or more TTIs according to the first TCI state. The UE 115 may then switch from the first TCI state to the second TCI state to receive the second portion of the downlink signal. In some examples, the TCI switch may occur after a known offset (e.g., a known number of TTIs). Performing TCI state switching within the aggregated TTI may be faster than waiting to perform TCI state switching after a subsequent configuration message, which may improve system latency. In some cases, the DCI may indicate one or more TCI state for TTIs that are subsequent to the known offset, and may not indicate any TCI states for TTIs that are within the known offset. This may decrease signaling overhead, improving system efficiency.

Figure 2:
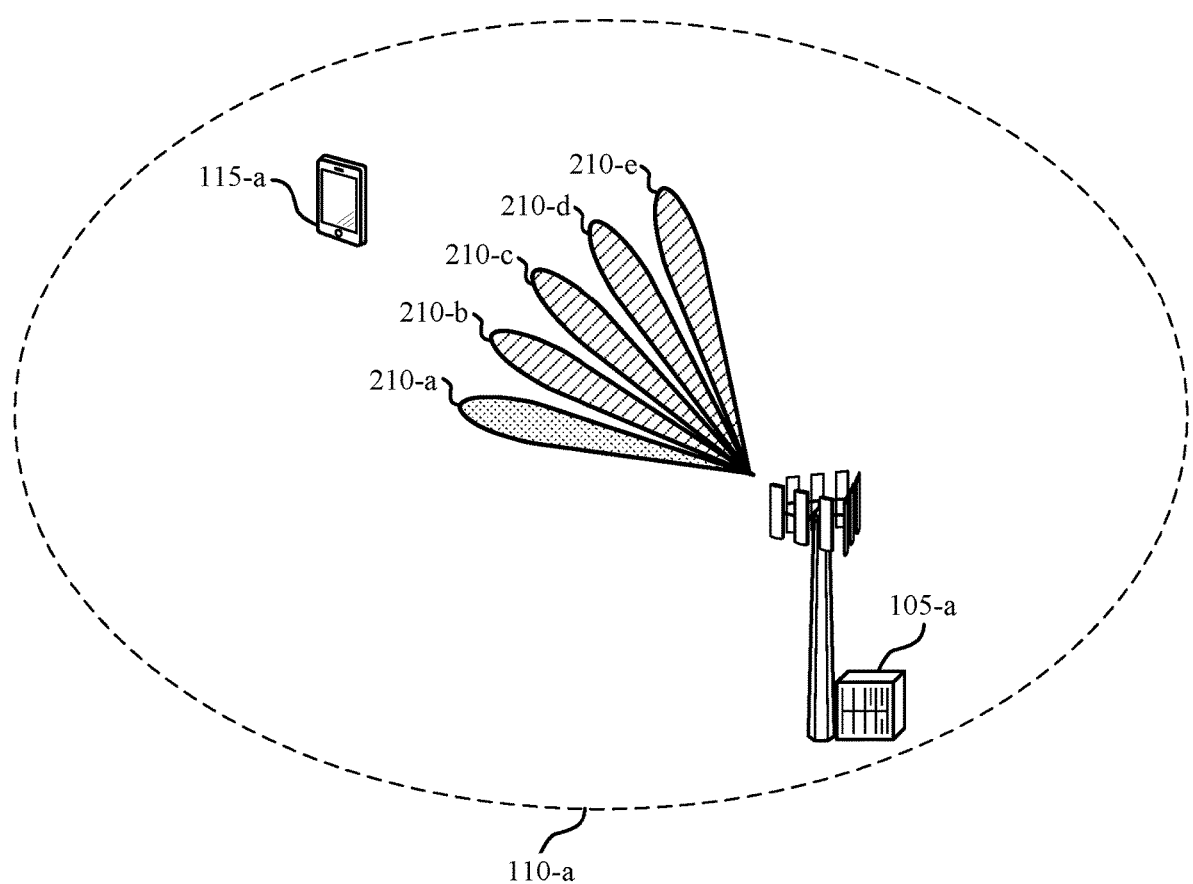
FIG. 2 illustrates an example of a wireless communications system that supports semi-static TCI configuration in accordance with aspects of the present disclosure.

FIG. 2 illustrates an example of a wireless communications system 200 that supports semi-static TCI configuration in accordance with aspects of the present disclosure. In some examples, wireless communications system 200 may implement aspects of wireless communications system 100. In some examples, wireless communications system 200 may represent a 5G system.

Base station 105-a may serve one or more UEs 115 within coverage area 110-a. In some examples, base station 105-a and UE 115-a may utilize highly directional waves (e.g., beams) for communication. For instance, base station 105-a may send one or more signals to UE 115-a via beams 210. In some examples, wireless communications system 200 (e.g., a mmW wireless network), may support macro diversity (e.g., signaling using different TCI states for different TTI, for example where each TTI of an aggregated TTI uses a different TCI state). Communicating using macro diversity may improve wireless communications where beamformed channels can be easily blocked (e.g., such as by a person walking in front of the UE, a user switching their grip on the UE, and the like). That is, if one beam fades, is blocked, suffers interference from another beam, or the position of UE 115-a changes, communications using macro diversity may be beneficial because one or more beams may still successfully carry transmissions.

In conventional wireless communications systems, such as a mmW wireless network, base station 105-a may send a transmission (e.g., physical downlink shared channel (PDSCH)) or a control transmission (a physical downlink control channel (PDCCH)), or the like via one or more beams 210. In some examples, macro diversity (e.g., signaling using a different TCI state for each TTI) may improve wireless communications where beamformed channels can be easily blocked. In some examples, UE 115-a and base station 105-a may support TTI aggregation. TTIs may be slots, mini-slots, or the like. Base station 105-a may send a first portion of a data message on first beam 210-a during a first TTI, a second portion of a data message on a second beam 210-b during a second TTI, a third portion of a data message on third beam 210-c during a third TTI, a fourth portion of a data message on fourth beam 210-d during a fourth TTI, a fifth portion of a data message on fifth beam 210-e during a fifth TTI, etc.

UE 115-a, for example, may configure different TCI states (e.g., a different configuration of antennas, ports, or antenna panels) to communicate via different beams 210. For instance, UE 115-a configure a first TCI state to receive beam 210-a, a second TCI state to receive beam 210-b, a third TCI state to receive third beam 210-c, etc. In some examples of macro diversity, base station 105-a and UE 115-a may support TTI (e.g., slot or mini-slot) aggregation. Each TTI of a set of aggregated TTIs may correspond to different TCI states, to receive signals on different beams 210.

In some examples of conventional wireless communication, macro diversity may be limited by UE 115 TCI switching capability. UE 115-a may be capable of receiving a PDSCH on one or more beams 210, decoding the received PDSCH, identifying a target TCI state for a TTI, and performing the TCI state switch. The amount of time it takes for UE 115-a to receive and decode the PDSCH, identify the target TCI, and perform a TCI state switch may be referred to as a TCI switching capability window. If one or more TCI switching points are scheduled to occur within the TCI switching capability window, then UE 115-a may be unable to perform the one or more instances of TCI switching. Problems arising from TCI switching within a TCI capability switching window are described in greater detail with respect to FIGS. 3-5. TCI state configurations that support macro diversity are described in greater detail with respect to FIGS. 6-10.

Figure 3:
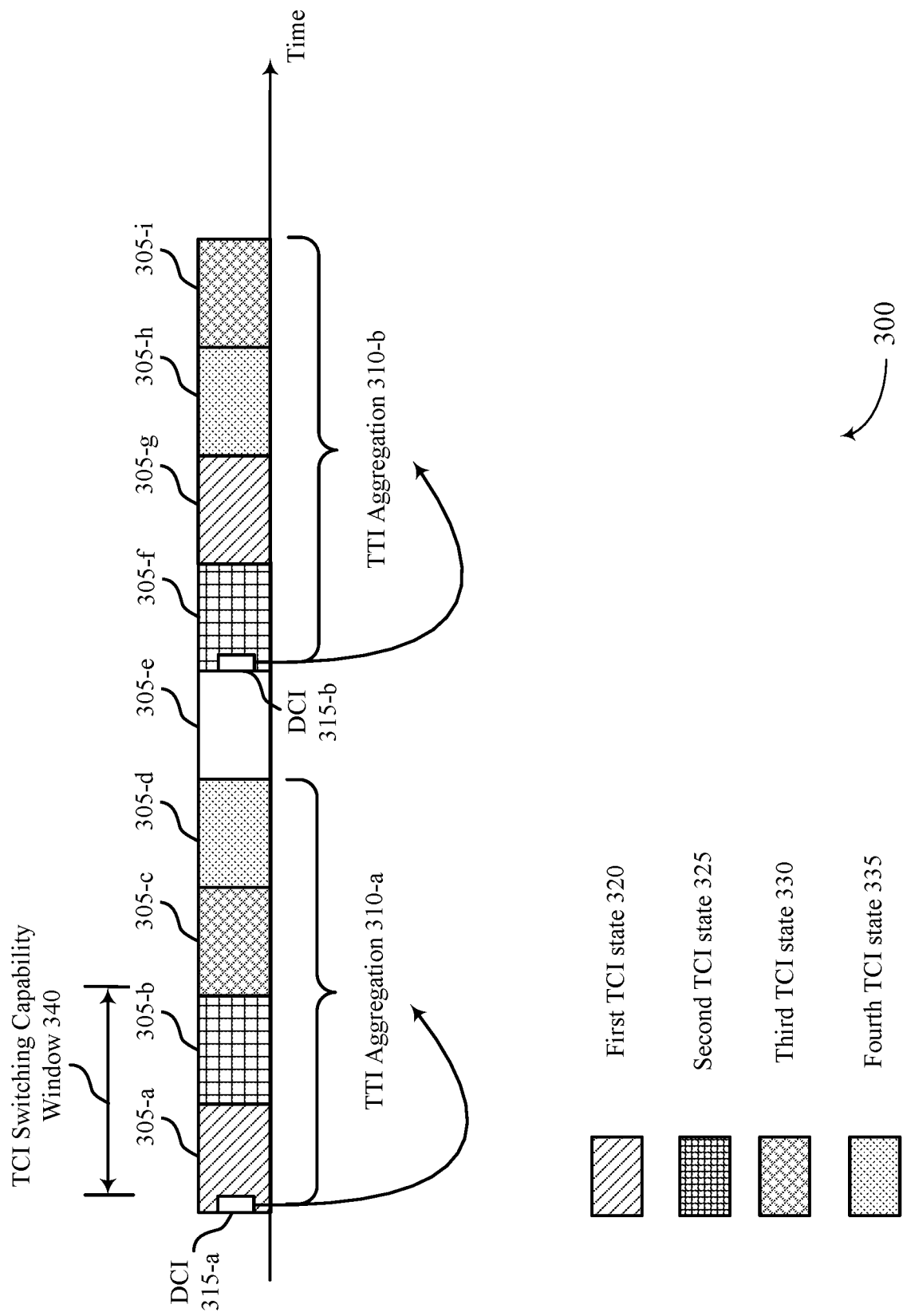
FIG. 3 illustrates an example of a TCI state switching scheme that supports semi-static TCI configuration in accordance with aspects of the present disclosure.

FIG. 3 illustrates an example of a TCI state switching scheme 300 that supports semi-static TCI configuration in accordance with aspects of the present disclosure. In some examples, TCI state switching scheme 300 may implement aspects of wireless communications systems 100 and 200.

In some examples, a base station 105 may send a data signal to a UE 115. A TTI aggregation framework (e.g., slot aggregation or mini-slot aggregation) may support macro diversity. In such examples, each TTI 305 of a TTI aggregation 310 may correspond to a TCI state, and each TCI state may correspond to a different beam.

In some examples, TTI aggregation techniques may be used to allocate two or more consecutive TTIs 305 in a single control transmission. In some examples, the TTI aggregation technique may be a slot aggregation technique, a mini-slot aggregation technique, or the like.

In an illustrative example, base station 105 may schedule a data transmission on a PDSCH. Base station 105 may transmit DCI 315-a to schedule a downlink data transmission on a number of aggregated TTIs 305 of TTI aggregation 310-a. Similarly, base station 105 may transmit DCI 315-b to schedule a downlink data transmission on a number of TTIs 305 of TTI aggregation 310-b. In some examples, the data transmission may be sent on multiple beams, which may correspond to multiple TCI states. That is, a UE may be configured to receive a downlink signal using a TCI state (e.g., adjusting or tuning one or more antenna ports, antenna panels, or the like, to receive a beam corresponding to the TCI state). In some examples, each beam may correspond to a different TCI state. For instance, four different TCI states may be used to receive four different beams. In other examples, a single TCI state may correspond to multiple beams (e.g., more refined beams). For instance, two TCI states may be used to receive four different beams. In some examples, different TCI states may be configured for different TTIs. For instance, each TTI 305 of a TTI aggregation 310 may correspond to a different TCI state. In other examples, two or three consecutive TTIs may be configured to receive downlink signals using the same TCI states. In some examples, each TTI of a TCI state period may receive downlink signals using unique TCI states. In some examples, a limited number of TCI states (e.g., four TCI states) may be used repeatedly, but non-consecutively across multiple TTIs (e.g., a repeating pattern of TCI states).

In some examples, base station 105 may schedule a downlink transmission. Base station 105 may send a DCI 315-a, for example, which may include scheduling information (e.g., a downlink grant). The scheduling information may allocate two or more consecutive TTIs 305 for the downlink transmission. The consecutive TTIs 305 (e.g., TTI 305-a, TTI 305-b, TTI 305-c, and TTI 305-d) may be referred to as a set of aggregated TTIs 305, or a TTI aggregation (e.g., TTI aggregation 310-a). In some examples, an indication of TTI aggregation (e.g., a number of TTIs 305 to be aggregated into a TTI aggregation 310) may be included in higher layer signaling (e.g., RRC signaling, media access control control element (MAC CE) signaling, or the like) or a DCI 315. In some examples, a UE 115 may receive a downlink grant including an indication of TCI state switching points during a TTI aggregation 310. UE 115 may be unable to perform TCI state switching during TCI switching capability window 430.

In an illustrative example, the data transmissions may be sent on four different beams. In such cases, UE 115 may be instructed to configure four different TCI states to receive the four different beams. However, the order of TCI states that UE 115 should configure to receive the data transmissions on the four different beams may not be the same for the data transmission scheduled in DCI 315-*a* as it is for the data transmission scheduled in DCI 315-*b*. That is, UE 115 may be configured to receive a first beam on first TCI state 320 during TTI 305-*a*, a second beam on second TCI state 325 during TTI 305-*b*, a third beam on TCI state 330 during TTI 305-*c*, and a fourth beam on TCI 335 during TTI 305-*d*. UE 115 may not be scheduled during TTI 305-*e*, but may receive DCI 315-*b* during TTI 305-*f* DCI 315-*b* may indicate a TTI aggregation 310-*b* and include a downlink grant. UE 115 may be instructed to receive a second beam on second TCI state 325 during TTI 305-*f*, a first beam on first TCI state 320 during TTI 305-*g*, a fourth beam on fourth TCI state 335 during TTI 305-*g*, and a third beam on third TCI state 330 during TTI 305-*i*.

In order to receive a scheduled data transmission, UE 115 may perform TCI state switches at TTI boundaries (e.g., from first TCI state 320 to second TCI state 325 between TTI 305-*a* and TTI 305-*b*, etc.). However, a UE 115 may use a minimum amount of time to receive a PDSCH on one or more beams, decode the received PDSCH, identify a target TCI state for a TTI 305, and perform the TCI state switch for the TTI 305. The amount of time the UE 115 takes to perform these actions may be referred to as TCI switching capability window 340. TCI switching capability window 340 may be indicated as a number of TTIs long (e.g., two TTIs).

In some examples, UE 115 may receive an indication of a TCI state switching point located outside of TCI switching capability window 340 (e.g., at the TTI boundary between TTI 305-*c* and TTI 305-*d*), and may be capable of performing the TCI state switch at that time. However, if the TCI state switching point indicated in DCI 315-*a* is located within TCI switching capability window 340 (e.g., the TCI switching point located at the TTI boundary between TTI 305-*a* and TTI 305-*b*), then UE 115 may be incapable of performing TCI state switching at that TCI switching point. In an illustrative example, UE 115 may communicate in FR2 of a 5G system, and granted TCI switching for a UE 115 capability may be a few slots, which may be based on PDCCH processing time, a TCI state configuration time, and the like. In some cases, TCI switching patterns for receiving PDCCHs may be the same as TCI switching patterns for receiving PDSCHs. In some cases, PDCCHs switching patterns may be different than TCI switching patterns for receiving PDSCHs. Some approaches to TCI state switching within TCI switching capability window 340 are described in greater detail with respect to FIGS. 4 and 5. Some aspects of such approaches may be insufficient.

Figure 4:
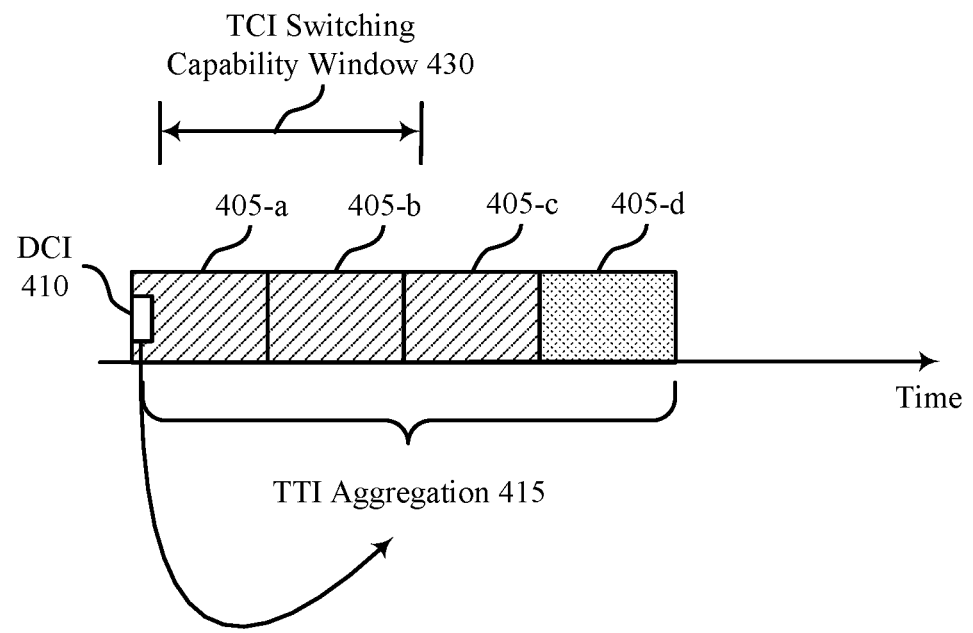
FIG. 4 illustrates an example of a TCI state switching scheme that supports semi-static TCI configuration in accordance with aspects of the present disclosure.
Figure 4:
Figure 4:
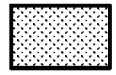

FIG. 4 illustrates an example of a TCI state switching scheme 400 that supports semi-static TCI configuration in accordance with aspects of the present disclosure. In some examples, TCI state switching scheme 400 may implement aspects of wireless communications systems 100 and 200.

In some examples, TTI aggregation techniques may be used to allocate two or more consecutive TTIs 405 in a single control transmission. In some examples, the TTI aggregation technique may be a slot aggregation technique, a mini-slot aggregation technique, or the like.

In some examples, base station 105 may schedule a downlink transmission. Base station 105 may send a DCI 410, for example, which may include scheduling information (e.g., a downlink grant). The scheduling information may allocate two or more consecutive TTIs 405 for the downlink transmission. The consecutive TTIs 405 (e.g., TTI 405-*a*, TTI 405-*b*, TTI 405-*c*, and TTI 405-*d*) may be referred to as a set of aggregated TTIs 405, or a TTI aggregation (e.g., TTI aggregation 415). In some examples, an indication of TTI aggregation (e.g., a number of TTIs 405 to be aggregated into a TTI aggregation 415) may be included in higher layer signaling (e.g., RRC signaling, MAC CE signaling, or the like) or a DCI 410. In some examples, a UE 115 may receive a downlink grant including an indication of TCI state switching points during a TTI aggregation 415. UE 115 may be unable to perform TCI state switching during TCI switching capability window 430.

Base station 105 may transmit DCI 410 to UE 115. DCI 410 may include a downlink grant for a data transmission during TTI aggregation 415. TTI aggregation 415 may include a number (e.g., four) of TTIs. However, as described in greater detail with respect to FIGS. 2 and 3, UE 115 may be unable to perform TCI state switching indicated by DCI 410 within TCI switching capability window 430. That is, if DCI 410 indicated a TCI state switch between TTI 405-*a* and TTI 405-*b*, UE 115 may be unable to perform the TCI state switch. In such examples, UE 115 may be unable to perform a TCI state switch until the TTI 405 subsequent to the last TTI 405 of the TCI switching capability window 430. For instance, where the TCI switching capability window 430 is equal to two TTIs, the TCI switching capability window 430 may begin during TTI 405-*a* after DCI 410. TCI switching capability window 430 may end during a third TTI 405-*c*. Because only part of TTI 405-*c* remains after the end of TCI switching capability window 430, UE 115 may be unable to perform TCI state switching until TTI 405-*d*.

UE 115 may perform TCI state switching after TCI switching capability window 430, which may result in decreased ability to support macro diversity. UE 115 may receive a downlink grant in DCI 410 for a TTI aggregation 415. UE 115 may receive downlink signals on first TCI state 420 during TTI 405-*a*, TTI 405-*b*, and TTI 405-*b* of TTI aggregation 415. First TCI state 420 may be a previously configured or previously used TCI state, or a default TCI state. DCI 410 may also indicate that a downlink signal scheduled for TTI 405-*d* is to be received on second TCI state 425. Because TTI 405-*d* is outside of TCI switching capability window 430, UE 115 may be capable of performing a TCI state switch from first TCI state 420 to second TCI state 425 at the TTI boundary between TTI 405-*c* and TTI 405-*d*.

In some conventional techniques, TCI state switching may be performed only across TTI aggregations 415. For instance, a UE may receive a downlink signal during the entirety of a TTI aggregation 415 using only one TCI state, and may receive another downlink signal during the entirety of another TTI aggregation. This, however, may result in increased system latency. Switching within a TTI aggregation 415, as described herein may support macro-diversity within TTI aggregations and improve system latency. However, in a TTI aggregation 415 of four TTIs 405 (where TCI switching capability window 430 is equal to two TTIs) communications with the base station 105 may be limited to two TCI states (and two beams). This may limit macro diversity and decrease system efficiency and reliability. An alternative conventional approach to TCI state switching within a TCI switching capability window 430 is described in greater detail with respect to FIG. 5.

Figure 5:
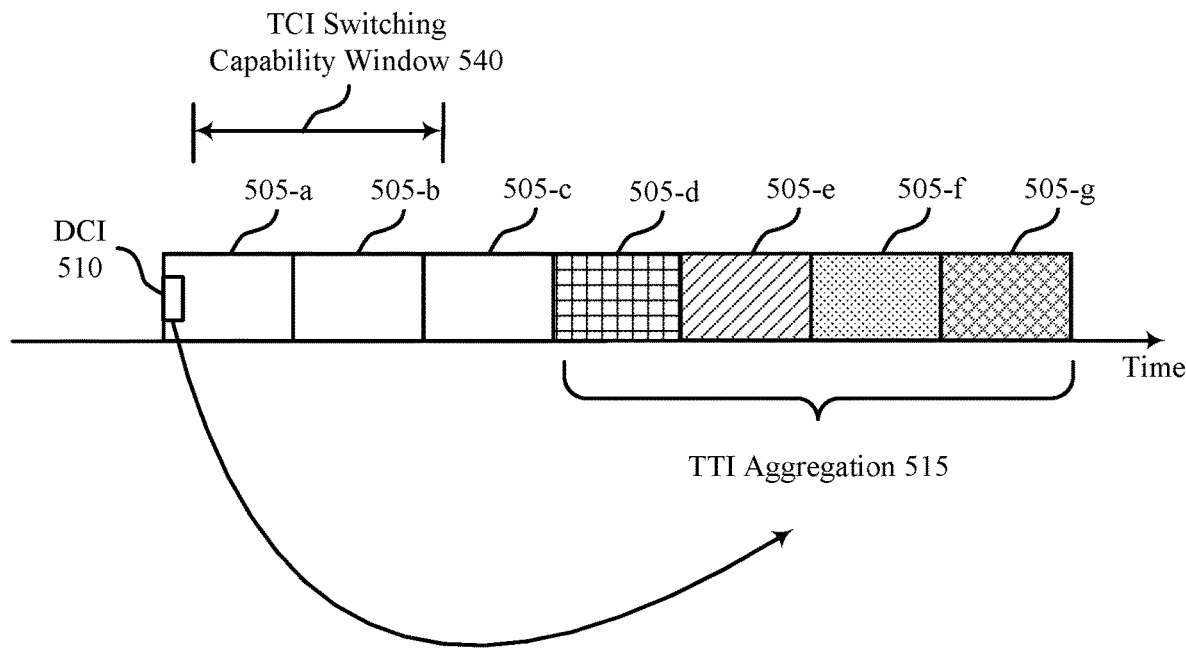
FIG. 5 illustrates an example of a TCI state switching scheme that supports semi-static TCI configuration in accordance with aspects of the present disclosure.
Figure 5:
Figure 5:
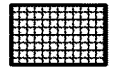
Figure 5:
Figure 5:
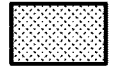

FIG. 5 illustrates an example of a TCI state switching scheme 500 that supports semi-static TCI configuration in accordance with aspects of the present disclosure. In some examples, TCI state switching scheme 500 may implement aspects of wireless communications systems 100 and 200.

In some examples, a UE 115 may receive a downlink grant and an indication of TCI state switching points during a TTI aggregation. UE 115 may be unable to perform TCI state switching during TCI switching capability window 540. Instead, a downlink grant may be a cross-TTI grant for subsequent TTIs, which may result in increased system latency and decreased user experience. For instance, as described in greater detail herein, a UE 115 may receive a downlink grant in a first TTI 505-a. To avoid a command to perform TCI state switching during TCI switching capability window 540, the downlink grant may be a cross-TTI grant for TTIs subsequent to TTI 505-c. Delaying the downlink transmission in TTI aggregation 515 to allow TCI state switching following TCI switching capability window 540 may result in unnecessary delays and increased system latency.

Base station 105 may send DCI 510, which may include a downlink grant during a number of TTIs 505 (e.g., TTI 505-d, TTI 505-e, TTI 505-f, and TTI 505-g) of TTI aggregation 515. Base station 105 may schedule the downlink transmission to be received by UE 115 on different TCI states 520, 525, 530, and 535. TTIs 505 in TTI aggregation 515 may be scheduled to allow TCI state switching, for example following TCI switching capability window 540. The cross-TTI grant (e.g., a cross-slot grant or a cross-minislot) in DCI 510 may indicate TTIs 505 that are subsequent to the TTI in which DCI 510 is received. For instance, base station 105 may send DCI 510 during TTI 505-a, and TCI switching capability window 540 may have a duration of any number of TTIs (e.g., two TTIs). TCI switching capability window 540 may follow DCI 510, and thus may include all or some of three TTIs 505 (e.g., TTI 505-a, TTI 505-b, and TTI 505-c. Because the UE 115 may be incapable of receiving a TCI state configuration during TTI 505-a and performing TCI state switching during any TTIs partially or totally included in TCI switching capability window 540, the downlink grant in DCI 510 may schedule the downlink transmission during TTI aggregation 515 subsequent to the last TTI 505-c that overlaps with TCI switching capability window 540.

Cross-TTI scheduling of downlink transmissions subsequent to the TCI switching capability window 540 may result in a delay in transmission of TTIs 505-a, 505-b, and 505-c, increasing system latency. In some examples, a UE 115 may perform TCI state switching based on a semi-statically configured TCI pattern, which may decrease or avoid the system latency resulting from the delayed scheduling described with respect to FIG. 5, or the decreased diversity described with respect to FIG. 4, and may increase system efficiency and improve user experience.

Figure 6:
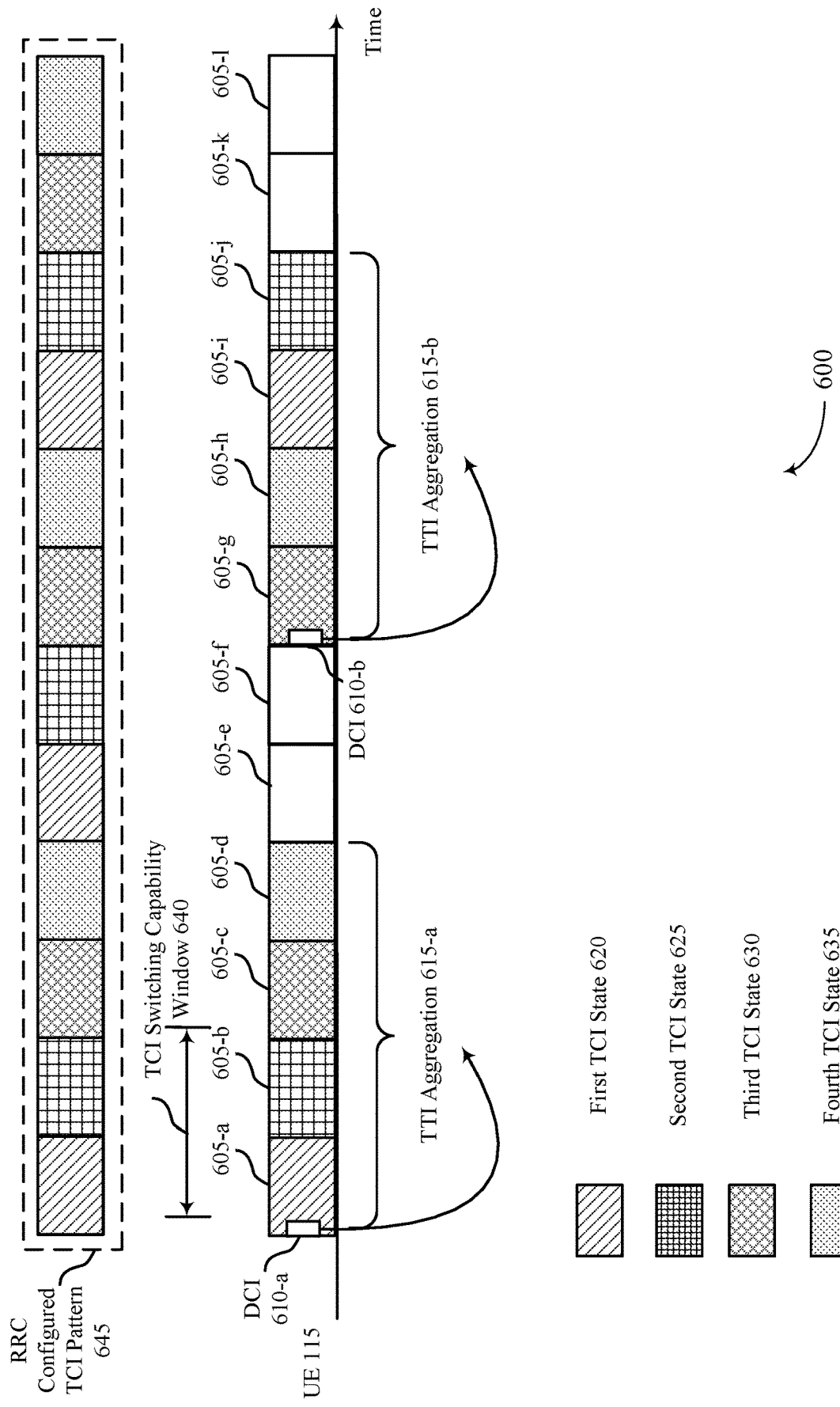
FIG. 6 illustrates an example of a TCI state switching scheme that supports semi-static TCI configuration in accordance with aspects of the present disclosure.

FIG. 6 illustrates an example of a TCI state switching scheme 600 that supports semi-static TCI configuration in accordance with aspects of the present disclosure. In some examples, TCI state switching scheme 600 may implement aspects of wireless communications systems 100 and 200.

In some examples, a UE 115 may perform TCI state switching based partially or completely on a semi-statically configured TCI pattern. The UE 115 may thus be able to perform TCI switching within a TCI switching capability window, and thereby support macro capability and avoid or decrease system latency. A semi-statically (e.g., RRC) configured switching period and switching pattern may be independent from DCI detection, and a UE 115 may perform TCI switching automatically unless otherwise indicated by a DCI. In some examples, the RRC configured switching pattern may apply to control monitoring. In some examples, another RRC configured TCI pattern may indicate TCI states for monitoring for and receiving control information.

In some examples, UE 115 may receive a downlink signal (e.g., an RRC message), and may identify a TCI pattern based thereon. The RRC configured TCI pattern may include a series of TCI states. In some examples, the RRC configured TCI pattern may include a different TCI state for each TTI for a TCI period (e.g., a period of time before a subsequent RRC message). The RRC configured TCI pattern may also include one or more repetitions of a sub-pattern. For example, the RRC configured TCI pattern may include a first TCI state 620, second TCI state 625, third TCI state 630, and fourth TCI state 635. The four TCI states may be repeated in the same order for the TCI period of the RRC configured TCI pattern. In some examples, the TCI pattern and the TCI time period may be configured via higher layer signaling (e.g., RRC signaling, MAC CE signaling, or the like). In some cases, the RRC signaling may also configure the UE with a TTI aggregation size (e.g., four TTIs). UE 115 may determine the RRC configured TCI pattern, and may receive downlink signals in multiple TTIs according to the TCI states of the RRC configured TCI pattern.

In some examples, UE 115 may receive one or more downlink signals based on the RRC configured TCI pattern. UE 115 may receive a DCI 610-a, which may include a downlink grant. The downlink grant may grant resources for a downlink transmission during TTI aggregation 615-a. UE 115 may tune one or more antennas or antenna panels in accordance with the RRC configured TCI pattern. That is, during TTI 605-a, UE 115 may receive a downlink signal on first TCI state 620. UE 115 may perform TCI state switching from first TCI state 620 to second TCI state 625 at a TTI boundary to receive a second downlink signal or a second portion of the same downlink signal on second TCI state 625 during TTI 605-b. UE 115 may perform TCI state switching during TTI aggregation 615-a, including during TCI switching capability window 640. TCI state switching within the TCI switching capability window 640 may be possible because UE 115 has been previously received the RRC configured TCI pattern, and therefore does not need time for receiving, decoding, and identifying TCI states from DCI 610-a before it can perform TCI state switching.

During non-scheduled TTIs 605-e, and 605-f, UE 115 may not receive any downlink signals, but may subsequently be scheduled to receive a second downlink signal during TTI aggregation 615-b. UE 115 may receive DCI 610-b, which may indicate resources during TTI aggregation 615-b for receiving the second downlink signal. TTI aggregation 615-a may include a first TTI 605-g, which may correspond to third TCI state 630 (instead of first TCI state 620). UE 115 may determine that the downlink signal is to be received on third TCI state 630 during TTI 605-g based on the RRC configured TCI pattern. Similarly, UE 115 may determine to receive the downlink signal on fourth TCI state 635 during second TTI 605-h, on first TCI state 620 during third TTI 605-I, and on second TCI state 625 during fourth TTI 605-j, based on the RRC configured TCI pattern.

In some examples, base station 105 may refrain from transmitting any TCI state information in a DCI 610, and UE 115 may rely on the RRC configured TCI pattern to determine which TCI states are to be used in which TTIs 605. In other examples, base station 105 may include one or more indications of a TCI state in a DCI 610. In such examples, UE 115 may ignore the TCI indications in DCI 610. In some such examples, UE 115 may perform TCI state switching based on TCI state indicators that apply to TTIs subsequent to TCI switching capability window 640, as described in greater detail with respect to FIG. 7.

Figure 7:
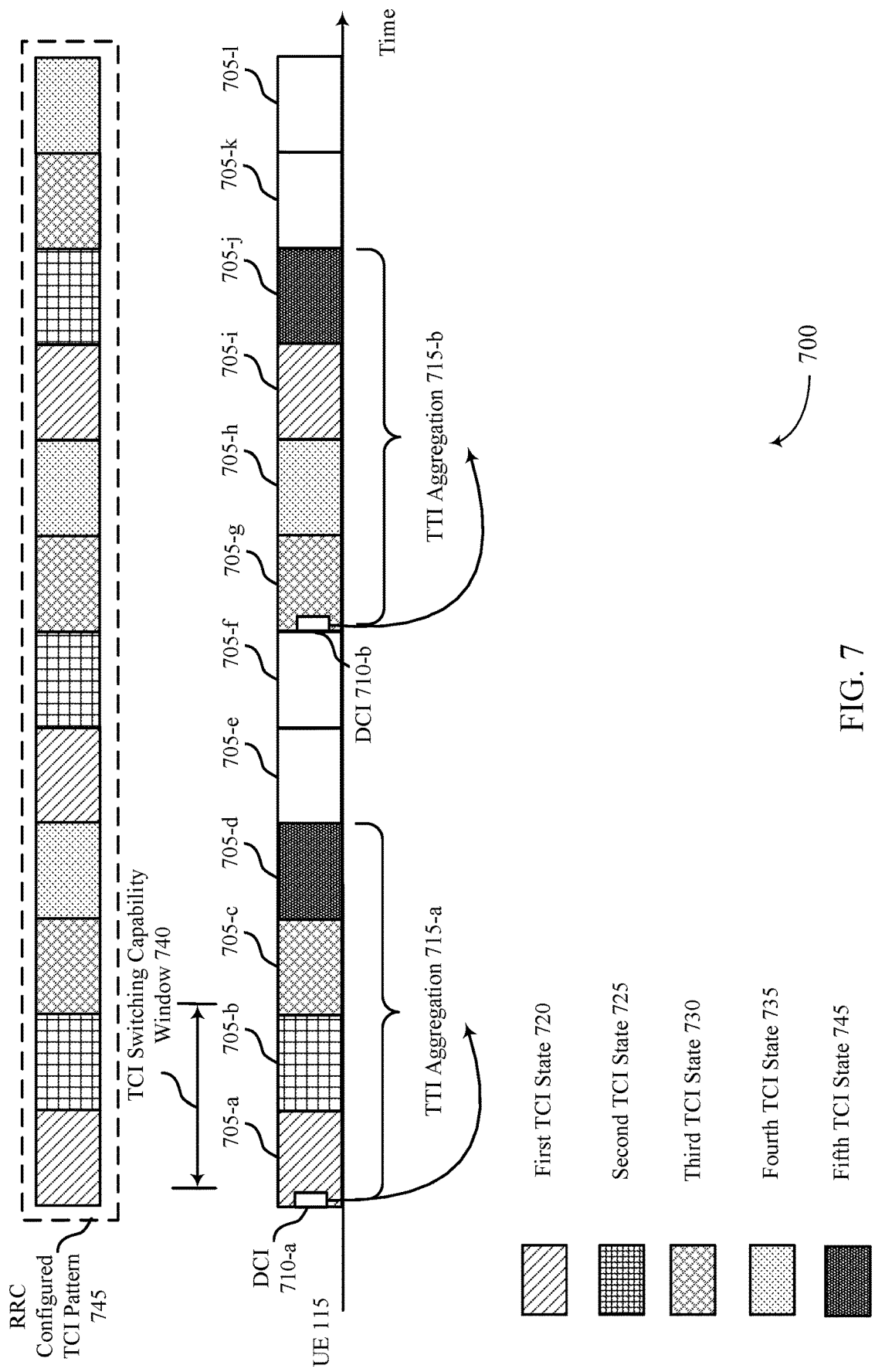
FIG. 7 illustrates an example of a TCI state switching scheme that supports semi-static TCI configuration in accordance with aspects of the present disclosure.

FIG. 7 illustrates an example of a TCI state switching scheme 700 that supports semi-static TCI configuration in accordance with aspects of the present disclosure. In some examples, TCI state switching scheme 700 may implement aspects of wireless communications systems 100 and 200. As described with respect to FIG. 6, a UE 115 may receive an RRC message indicating an RRC configured TCI pattern.

In some examples, UE 115 may perform TCI switching based on the RRC configured switching period and switching pattern in combination with DCI based TCI switching. UE 115 may receive a downlink grant in DCI 710-a. The downlink grant may indicate resources for receiving one or more downlink signals during one or more TTI aggregations 715. UE 115 may perform TCI state switching between the various TCI states of the RRC configured TCI pattern during the TTI aggregations 715, and may not receive any downlink signals or perform TCI state switching during unscheduled TTIs 705 (e.g., TTI 705-e, or TTI 705-f).

In some examples, the RRC configured TCI pattern may be longer than the TCI switching capability window 740, and TCI switching outside of TCI switching capability window 740 may be controlled partially or wholly by a DCI 710. For example, UE 115 may receive DCI 710-a during a first TTI 705-a. A downlink grant in DCI 710-a may reserve resources during TTI aggregation 715-a for a downlink transmission. UE 115 may receive three different beams during TTI 705-a, TTI 705-b, and TTI 705-c, by switching to first TCI state 720, second TCI state 725, and third TCI state 730, respectively. UE 115 may perform these TCI state switches according to the RRC configured TCI pattern during the first three TTIs 705 that overlap wholly or partially with the TCI switching capability window 740. However, UE 115 may be capable of performing DCI configured TCI switching for TTIs 705 outside of TCI switching capability window 740. DCI 710-a may include an indication of a fifth TCI state 745 for TTI 705-d, which is the first TTI 705 located wholly outside of TCI switching capability window 740. UE 115 may perform TCI state switching from third TCI state 730 during TTI 705-c to fifth TCI state 745 during TTI 705-d (instead of the RRC configured fourth TCI state 735 for TTI 705-d) based on the TCI state indication in DCI 710-a. After performing TCI state switching based on DCI 710-a, (e.g., after expiration of a timer having a known or predetermined time duration) UE 115 may revert to performing TCI state switching based on the RRC configured TCI pattern (e.g., during TTI 795-g, TTI 7095-h, and TTI 705-i) unless indicated by another DCI 710-b. If DCI 710-b includes another indication of a fifth TCI state 745 for TTI 705-j, then UE 115 may similarly perform TCI state switching based on the DCI 710-b, instead of the RRC configured TCI pattern during indicated TTI 705-j and may then revert to performing TCI state switching based on the RRC configured TCI pattern for subsequent downlink transmissions.

In some examples, a DCI 710 may not specify a TCI state within the TCI switching capability window 740 because the UE 115 may be incapable of performing TCI state switching based on the DCI 710 within the TCI switching capability window 740. In such examples, base station 105 may not specify a TCI state for TTIs 705 within TCI switching capability window 740, and UE 115 may use the default pattern (e.g., the RRC configured TCI pattern). In such examples, a table indicating TCI states for TTIs 705 of one or more TTI aggregations 715 may be smaller, resulting in extra data that can be used for other purposes. Alternatively, UE 115 may ignore entries in the table that correspond to TTIs 705 within the TCI switching capability window 740.

Figure 8:
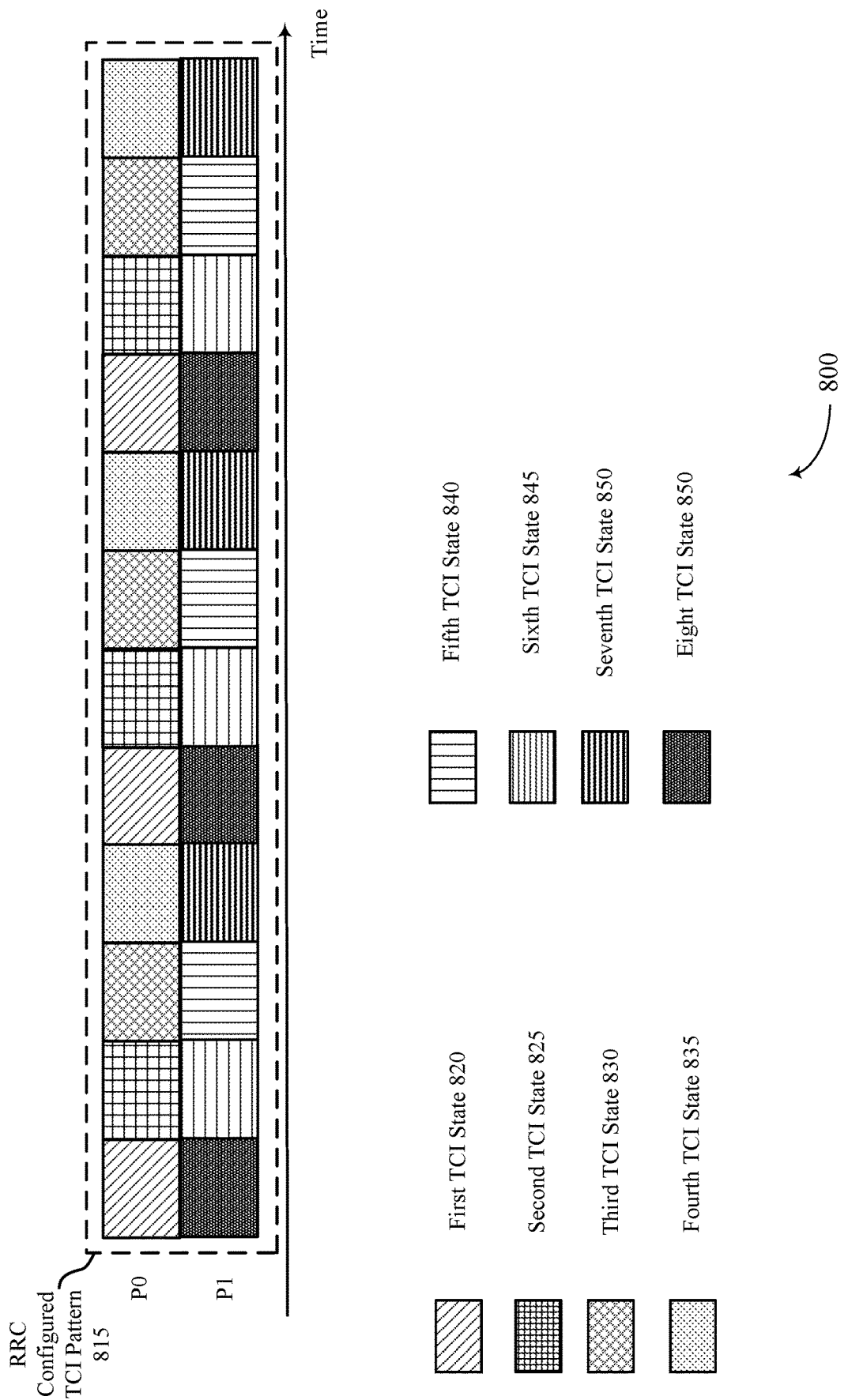
FIG. 8 illustrates an example of a TCI state switching scheme that supports semi-static TCI configuration in accordance with aspects of the present disclosure.

FIG. 8 illustrates an example of a TCI state switching scheme 800 that supports semi-static TCI configuration in accordance with aspects of the present disclosure. In some examples, TCI state switching scheme 800 may implement aspects of wireless communications systems 100 and 200.

In some examples, as described in greater detail with respect to FIGS. 6 and 7, UE 115 may perform TCI state switching based on an RRC configured TCI pattern 815. In some examples, UE 115 may support Rank1 communications on a single link. In some examples, UE 115 may communicate via more than one wireless link, and TTI aggregation may be extended to Rank2 and above.

Base station 105 may configure, via RRC signaling, the TCI pattern 815 in multiple (e.g., two) dimensions. For example, the RRC configured TCI pattern 815 may include a first portion (e.g., a time domain pattern) and a second portion (e.g., a spatial domain pattern). The TCI pattern 815 may include first TCI state 820, second TCI state 825, third TCI state 830, fourth TCI state 835, fifth TCI state 840, sixth TCI state 845, seventh TCI state 850, and eight TCI state 855.

In some examples, each antenna or each port of a UE 115 may follow its own pattern. In such examples, each antenna or port (e.g., ports P0 and P1) may perform TCI state switching independently, according to its own corresponding RRC configured TCI pattern 815. For instance, an RRC configured TCI pattern 815 for the first port (e.g., P0) may include a periodic repetition of first TCI state 820, second TCI state 825, third TCI state 830, and fourth TCI state 835. An RRC configured TCI pattern 815 for the second port (e.g., P1) may include a periodic repetition of eight TCI state 850, sixth TCI state 845, fifth TCI state 840, and seventh TCI state 850. Dynamic port selection can be supported, such that one or both ports may be selected for downlink transmissions. For instance, an RRC message may include an indication of the TCI pattern 815, and an indication of which link is required or preferred for subsequent communications, or that both links will be utilized for subsequent communications.

Figure 9:
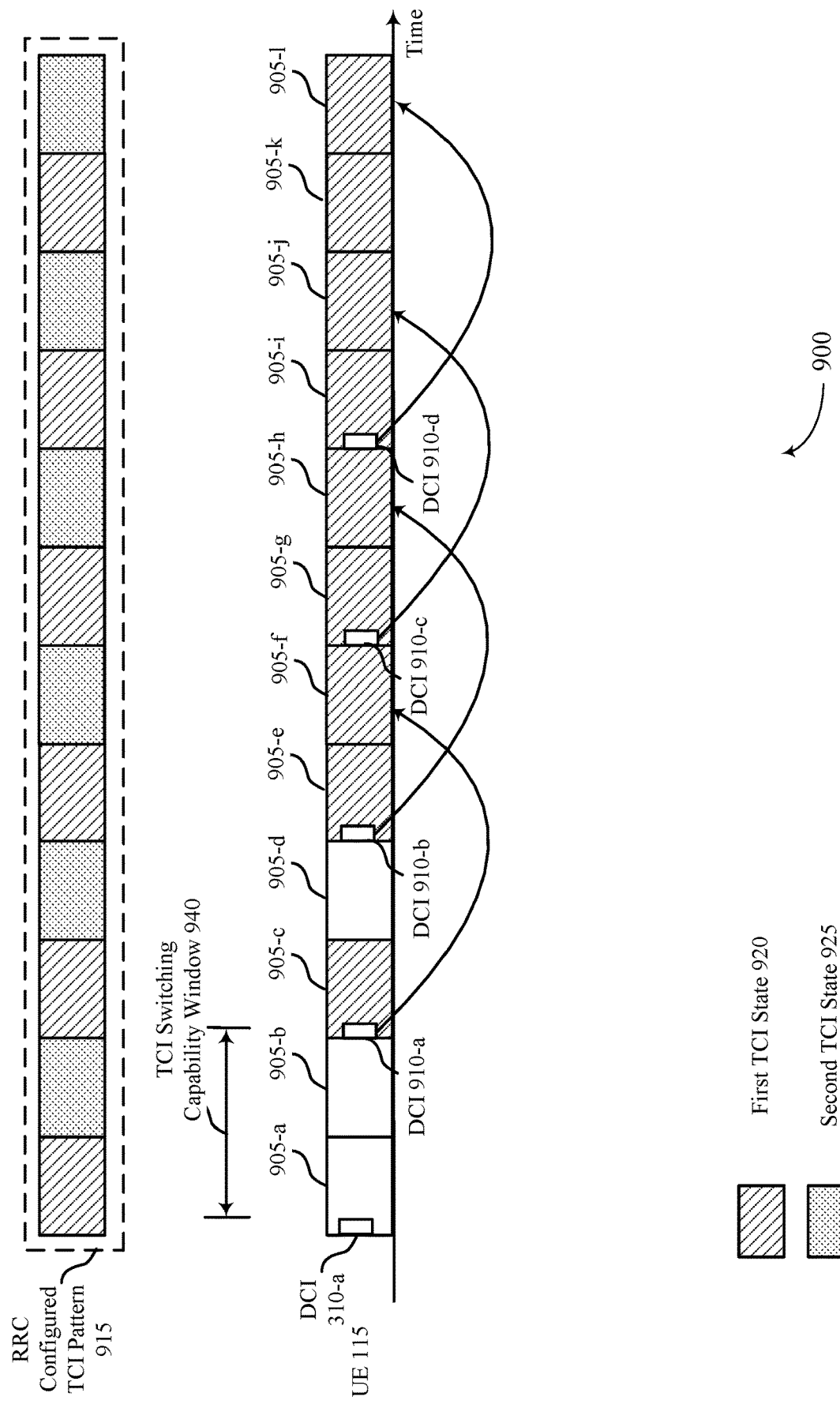
FIG. 9 illustrates an example of a TCI state switching scheme that supports semi-static TCI configuration in accordance with aspects of the present disclosure.

FIG. 9 illustrates an example of a TCI state switching scheme 900 that supports semi-static TCI configuration in accordance with aspects of the present disclosure. In some examples, TCI state switching scheme 900 may implement aspects of wireless communications system 100.

In some examples, UE 115 may perform TCI switching based on the RRC configured switching period and switching pattern in combination with DCI based TCI state switching. A UE 115 may communicate with a base station on multiple links (e.g., two links), and one link may be preferred over the other. Additionally, base station 105 may perform single-TTI (e.g., single-slot or single multi-slot) transmissions to UE 115. UE 115 may perform TCI state switching between two TCI states for the two links. If base station 105 is aware of which link is preferred, then base station 105 may send inactions in cross-TTI grants to change identified TTIs from an RRC configured TCI state to a DCI configured TCI state.

In some examples, as described in greater detail with respect to FIGS. 6 and 7, base station 105 may send an RRC message which may include an indication of an RRC configured TCI pattern. UE 115 may receive DCIs 315 indicating a cross-TTI single-TTI grant. In some cases, UE 115 may receive single-TTI downlink transmissions in identified TTIs 905 based on the TCI state indicated by the RRC configured TCI pattern.

In some examples, one link may be preferred over another link. For instance, a first link corresponding to first TCI state 920 may be preferred over a second link corresponding to second TCI state 925. The second link may fade, experience interference, or UE 115 may change locations such that the second link is no longer successfully received. In such cases, it may be beneficial to receive transmissions using first TCI state 920, instead of second TCI state 925.

In some examples, UE 115 may be unable to receive a DCI 910 and perform TCI state switching within TCI switching capability window 940. UE 115 may perform TCI switching based on an RRC configured switching pattern and DCI configured TCI state switching. For instance, base station 105 may send DCI 910-a, including a cross-TTI grant for a single-TTI transmission in TTI 905-f. DCI 910-a may further include an indication to switch from second TCI state 925 to first TCI state 920 for TTI 905-f. UE 115 may be capable of performing the indicated TCI state switch at TTI 905-f, because TTI 905-f is located outside of the TCI switching capability window 940. UE 115 may successfully receive DCI 910-a during TTI 905-c because the preferred beam may be received on first TCI state 920. UE 115 may receive no transmission during TTI 905-d, but may receive a single-TTI transmission during TTI 905-e on first TCI state 920, according to the RRC configured TCI pattern. UE 115 may also perform TCI state switching (or leave the antenna configuration along between TTI 905-e and TTI 905-f) to receive the downlink transmission scheduled by DCI 910-a during TTI 905-f on first TCI state 920. UE 115 may receive a downlink transmission on first TCI state 920 during 905-g according to the RRC configured TCI pattern, and may receive DCI 910-b. DCI 910-b may include a downlink grant for TTI 905-h, and an indication to perform TCI state switching from second TCI state 925 (as indicated in the RRC configured TCI pattern) to first TCI state 920 for TTI 905-h. UE 115 may be capable of performing the indicated TCI state switch at TTI 905-h, because TTI 905-h is located outside of the TCI switching capability window 940 for DCI 910-b.

UE 115 may receive downlink signals in one or more of TTIs 905-g, 905-i, or 905-k, using the first TCI state 920 based on the RRC configured TCI pattern. UE 115 may also receive one or more downlink signals in one or more of TTIs 905-j, or 905-1, using the first TCI state 920 based on an indication received in a cross-TTI grant for a single-TTI transmission included in DCI 910-c, or DCI 910-d, respectively. This approach may be faster than modifying the TCI state in a future TTI (e.g., slot) that can be changed (e.g., via RRC signaling). UE 115 may revert to receiving downlink signals on the TCI state of the RRC configured pattern unless otherwise indicated by a DCI 910 (e.g., after expiration of a timer having a known or predetermined time duration). Subsequently, UE 115 may receive another RRC message with an updated RRC configured pattern that does not include the non-preferred TCI state (e.g., second TCI state 925).

Figure 10:
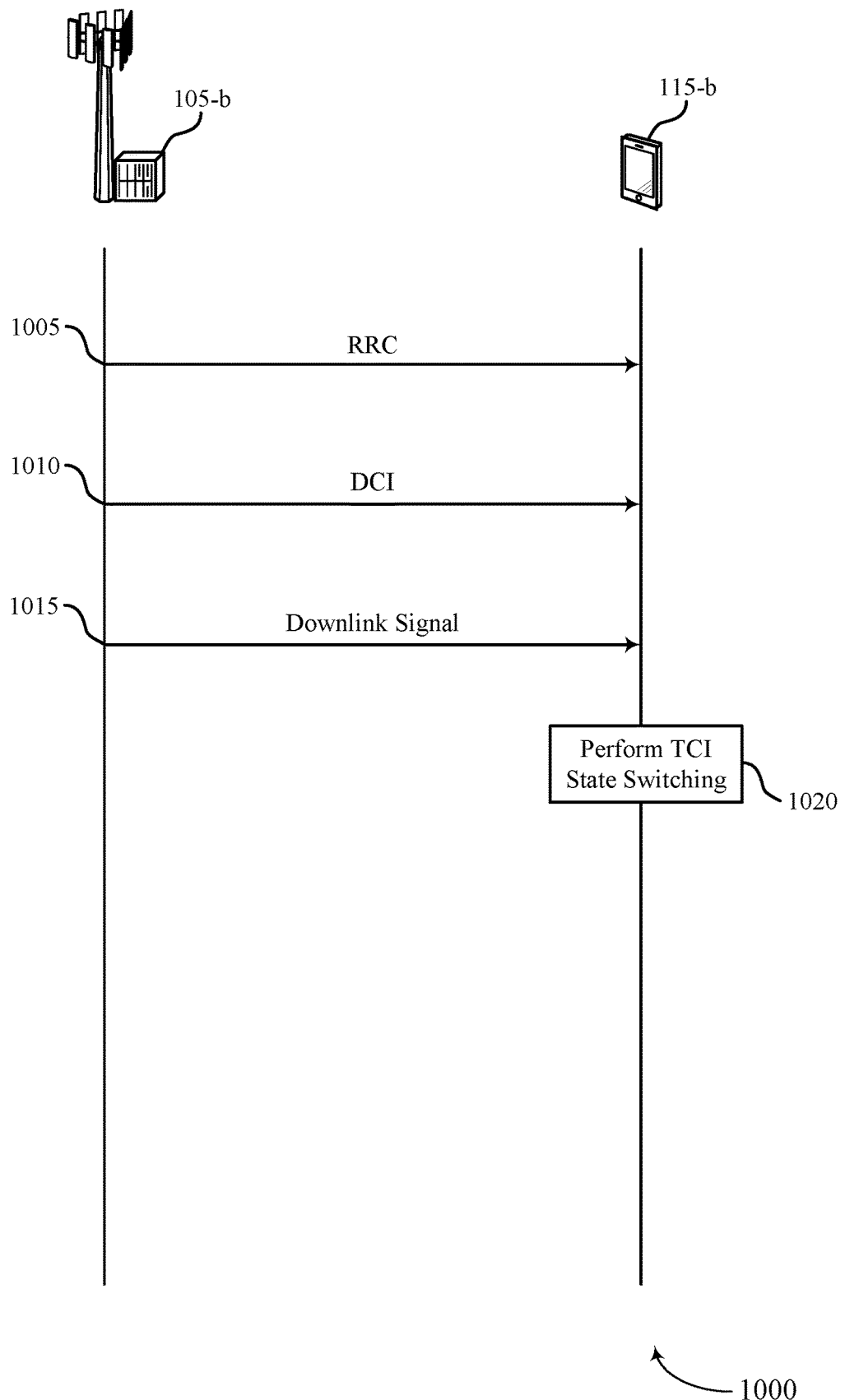
FIG. 10 illustrates an example of a process flow that supports semi-static TCI configuration in accordance with aspects of the present disclosure.

FIG. 10 illustrates an example of a process flow 1000 that supports semi-static TCI configuration in accordance with aspects of the present disclosure. In some examples, process flow 1000 may implement aspects of wireless communications system 100. In some examples, process flow 1000 may be implemented by UE 115-b and base station 105-b, which may be examples of similar devices described with respect to FIGS. 1 and 2.

At 1005, base station 105-b may transmit, and UE 115-b may receive, a configuration message. The configuration message may be an RRC message, and may indicate a TCI state switching pattern and a TCI state switching period. The indication may be explicitly or implicitly, for example by identifying an entry in a configuration table including entries for the patterns and periods, or by providing values also associated with other configuration parameters that may be used by the UE to determine the pattern and period. The TCI state switching period may identify a number of TTIs and the TCI state switching pattern may indicate a TCI state for each of the TTIs in the TCI state switching period. In some examples, the RRC configuration may also indicate a TTI aggregation number, or may initiate a TTI aggregation mode. In other examples, the indication of the TTI aggregation number and/or TTI aggregation mode may be separately indicated, for example in separate RRC signaling.

At 1010, base station 105-b may transmit a DCI. The DCI may include a downlink grant, indicating resources for the UE 115-b to use to receive a downlink transmission from base station 105-b at 1020. In some examples, the downlink grant may also include an indication of TCI states for receiving a portion of the downlink signal during TTIs outside of a known offset (e.g., outside a TCI switching capability window).

At 1015, base station 105-b may transmit a downlink signal during one or more TTIs of the TCI switching period. The downlink signal may be a data signal or a control signal.

At 1020, UE 115-b may perform TCI state switching. UE 115-b may receive the downlink signal at 1015 using TCI states according to the TCI state switching pattern received at 1005. UE 115-b may perform TCI state switching solely or partly based on the TCI state switching pattern. In some examples, UE 115 may also perform TCI state switching (on TTIs after a known offset) based on an indication received in DCI 1010, and may perform TCI state switching based on both the TCI state switching pattern and the indication in the DCI. By using the RRC configured TCI state switching pattern, the UE 115-b may support macro-diversity, and decrease system latency.

Figure 11:
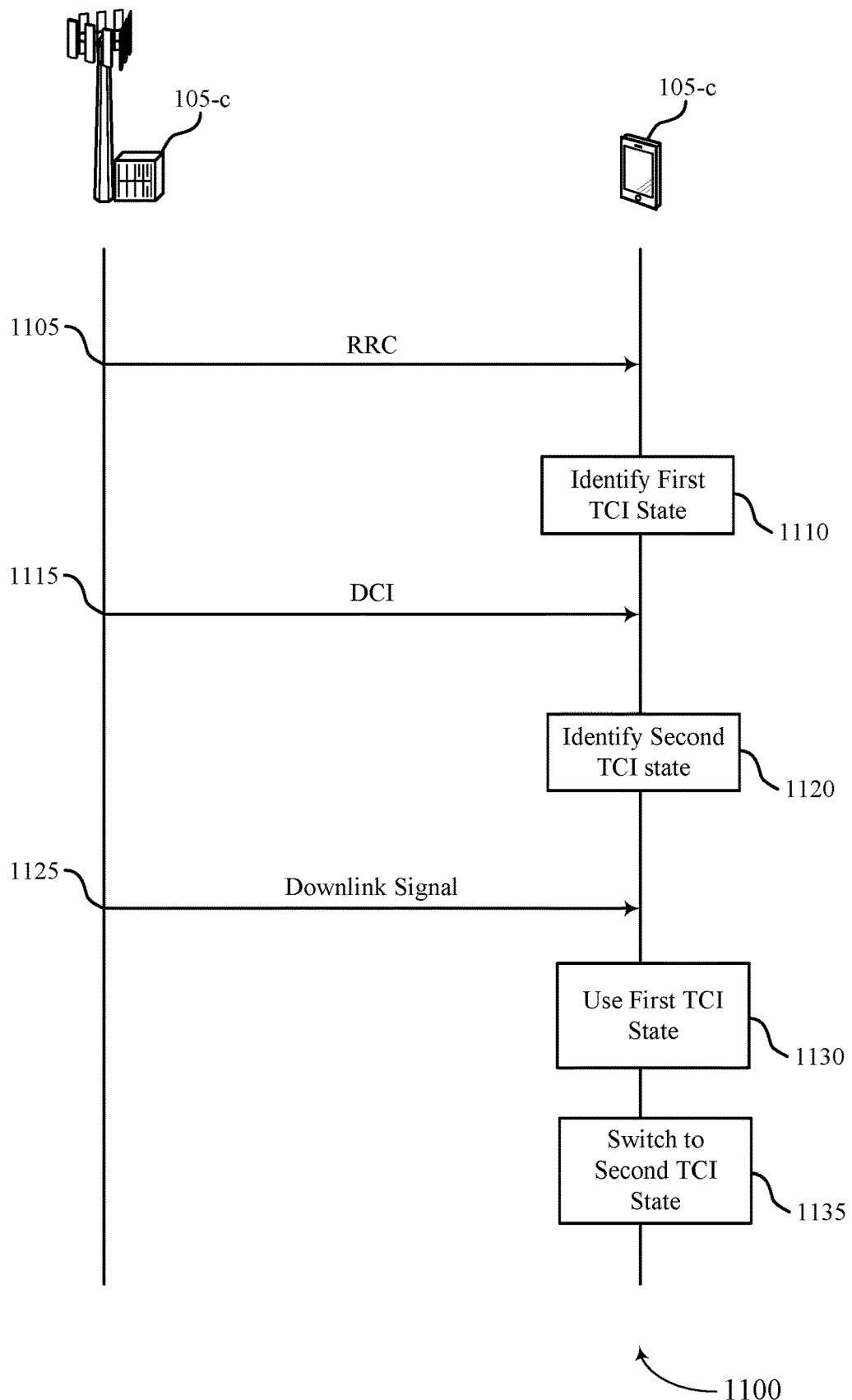
FIG. 11 illustrates an example of a process flow that supports semi-static TCI configuration in accordance with aspects of the present disclosure.

FIG. 11 illustrates an example of a process flow 1100 that supports semi-static TCI configuration in accordance with aspects of the present disclosure. In some examples, process flow 1100 may implement aspects of wireless communications system 100. In some examples, process flow 1100 may be implemented by UE 115-c and base station 105-c, which may be examples of similar devices described with respect to FIGS. 1 and 2.

At 1105 base station 105-c may transmit a configuration message. The configuration message may be an RRC message. In some examples, the RRC message may include a configuration indication a first TCI state for the UE 115-c to use for receiving downlink signals. At 1110, UE 115-c may identify the first TCI state based on the RRC message received at 1105. In some cases, the UE 115-c may adopt the first TCI state as a default TCI state.

At 1115, base station 105-c may transmit a DCI. The DCI may include a downlink grant of resources for a downlink signal to be sent at 1125 by base station 105-c. The DCI may also include an indication of a second TCI state. In some examples, the DCI may include a TCI state switching indication that applies to TTIs following a known offset from the TTI in which the DCI is transmitted at 1115. The number TCI state entries, and thus the size of the corresponding DCI, may be decreased by excluding from the DCI the TCI state entries for TTIs located within the known offset (e.g., within a TCI switching capability window).

At 1120, UE 115-*c* may receive the DCI, and may identify the second TCI state based thereon. UE 115-*c* may further identify one or more TTIs for which the second TCI state is to be used based on the DCI.

At 1125, base station 105-*c* may transmit a downlink signal according to the downlink grant in the DCI. The downlink signal may be sent using TTI aggregation techniques. For instance, the downlink transmission may be sent across a set of two or more aggregated TTIs.

At 1130, UE 115-*c* may receive a first portion of the downlink signal using the first TCI state, according to the configuration received in the RRC at 1105. At 1135, as indicated in the DCI at 1115, UE 115-*c* may switch from the first TCI state to the second TCI state. UE 115-*c* may receive a second portion of the downlink signal using the second TCI state. Within the same TTI aggregation, UE 115-*c* may receive the downlink signal using macro-diversity (e.g., on multiple beams), which may improve overall system efficiency, and decrease system latency.

Figure 12:
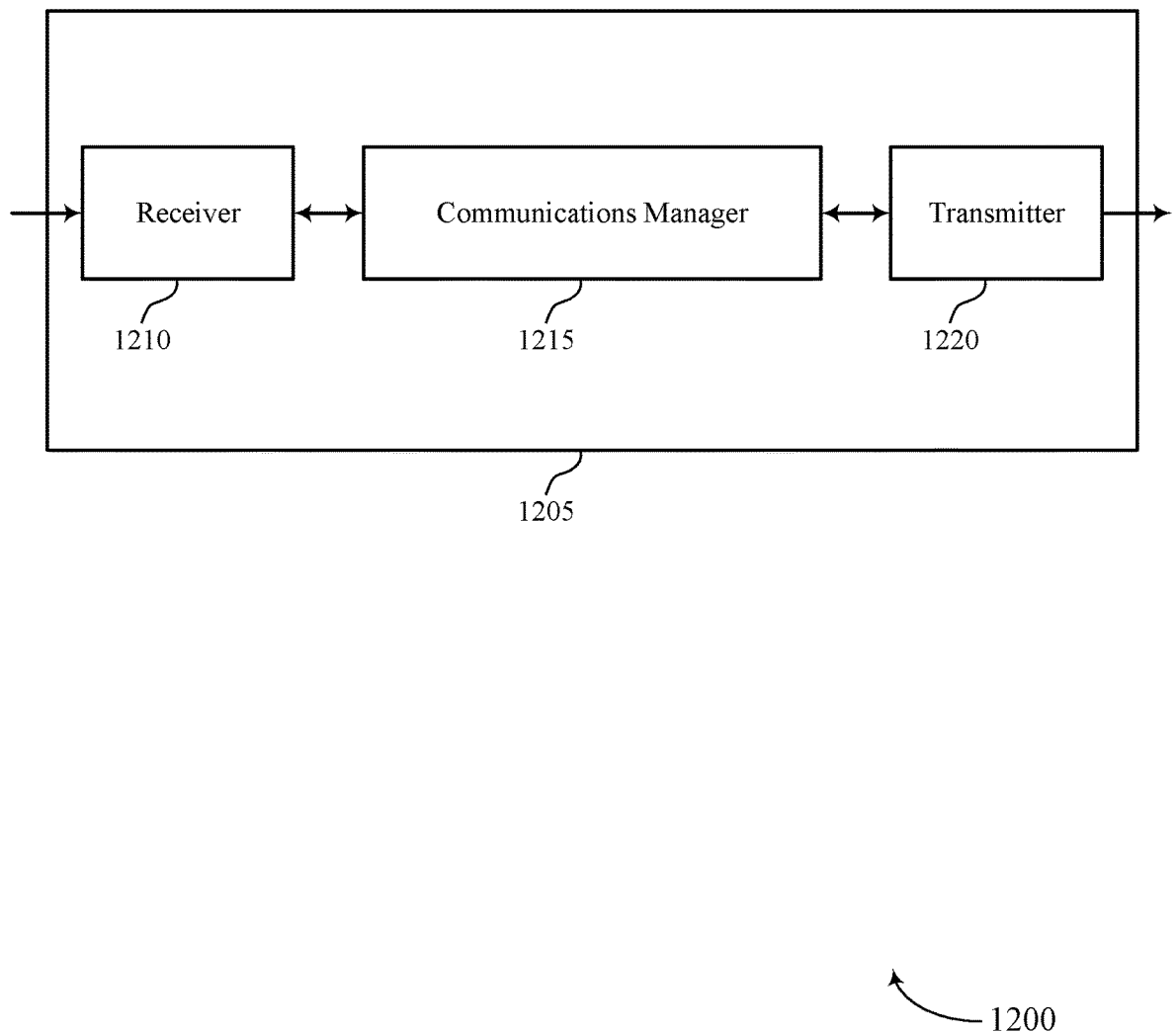
FIGS. 12 and 13 show block diagrams of devices that support semi-static TCI configuration in accordance with aspects of the present disclosure.

FIG. 12 shows a block diagram 1200 of a device 1205 that supports semi-static TCI configuration in accordance with aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to semi-static TCI configuration, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may receive a configuration indicating a TCI state switching pattern and a TCI state switching period, the TCI state switching period indicating a number of a set of TTIs, and the TCI state switching pattern indicating a TCI state for each of the set of TTIs, perform, by the UE, TCI state switching according to the TCI state switching pattern and the TCI state switching period, and receive a downlink transmission during at least one of the set of TTIs of the TCI state switching pattern. The communications manager 1215 may also receive a configuration indicating a first TCI state for the UE to use to receive downlink signals, receive, in a first TTI according to the first TCI state indicated by the received configuration, a DCI signal indicating a second TCI state, the first TTI being one of a set of TTIs aggregated in a TTI aggregation period, switch, responsive to the received DCI signal, to the indicated second TCI state for a second TTI of the set of TTIs aggregated in the TTI aggregation period, and receive a downlink signal in the second TTI according to the second TCI state. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

In some examples, the communications manager 1215 may be implemented as an integrated circuit or chipset for a mobile device modem, and the receiver 1210 and transmitter 1220 may be implemented as analog components (e.g., amplifiers, filters, antennas) coupled with the mobile device modem to enable wireless transmission and reception over one or more bands.

The communications manager 1215 as described herein may be implemented to realize one or more potential advantages. One implementation may allow the device 1205 to receive a configuration indicating a TCI state switching pattern and a TCI state switching period. The TCI state switching pattern may indicate a TCI state for each of a plurality of TTIs and the TCI state switching period may indicate a number of a plurality of TTIs. The TCI state switching may increase reliability and reduce latency during transmissions.

Based on techniques for implementing a TCI state switching as described herein, a processor of a UE 115 (e.g., controlling the receiver 1210, the transmitter 1220, or the transceiver 1520 as described with reference to FIG. 15) may increase reliability and decrease signaling overhead in the communications because the UE 115 may remain in communication with other devices.

Figure 13:
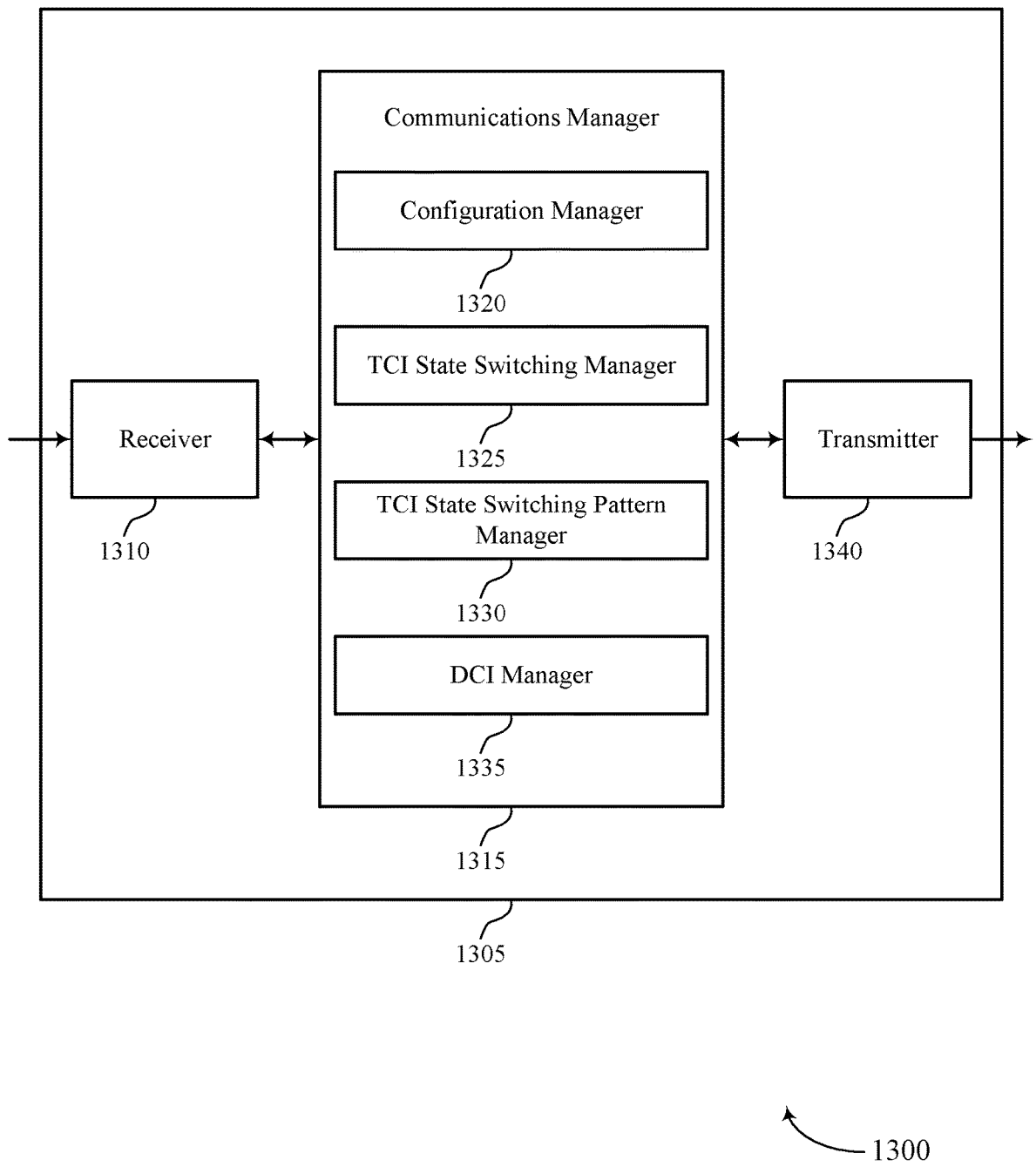

FIG. 13 shows a block diagram 1300 of a device 1305 that supports semi-static TCI configuration in accordance with aspects of the present disclosure. The device 1305 may be an example of aspects of a device 1205, or a UE 115 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to semi-static TCI configuration, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a configuration manager 1320, a TCI state switching manager 1325, a TCI state switching pattern manager 1330, and a DCI manager 1335. The communications manager 1315 may be an example of aspects of the communications manager 1510 described herein.

The configuration manager 1320 may receive a configuration indicating a TCI state switching pattern and a TCI state switching period, the TCI state switching period indicating a number of a set of TTIs, and the TCI state switching pattern indicating a TCI state for each of the set of TTIs.

The TCI state switching manager 1325 may perform, by the UE, TCI state switching according to the TCI state switching pattern and the TCI state switching period. The TCI state switching pattern manager 1330 may receive a downlink transmission during at least one of the set of TTIs of the TCI state switching pattern. The configuration manager 1320 may receive a configuration indicating a first TCI state for the UE to use to receive downlink signals.

The DCI manager 1335 may receive, in a first TTI according to the first TCI state indicated by the received configuration, a DCI signal indicating a second TCI state, the first TTI being one of a set of TTIs aggregated in a TTI aggregation period. The TCI state switching manager 1325 may switch, responsive to the received DCI signal, to the indicated second TCI state for a second TTI of the set of TTIs aggregated in the TTI aggregation period and receive a downlink signal in the second TTI according to the second TCI state.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

In some examples, the communications manager 1315 may be implemented as an integrated circuit or chipset for a mobile device modem, and the receiver 1310 and transmitter 1340 may be implemented as analog components (e.g., amplifiers, filters, antennas) coupled with the mobile device modem to enable wireless transmission and reception over one or more bands.

The communications manager 1315 as described herein may be implemented to realize one or more potential advantages. One implementation may allow the device 1305 to receive a configuration indicating a TCI state switching pattern and a TCI state switching period. The TCI state switching pattern may indicate a TCI state for each of a plurality of TTIs and the TCI state switching period may indicate a number of a plurality of TTIs. The TCI state switching may increase reliability and reduce latency during transmissions.

Based on techniques for implementing a TCI state switching as described herein, a processor of a UE 115 (e.g., controlling the receiver 1310, the transmitter 1340, or the transceiver 1520 as described with reference to FIG. 15) may increase reliability and decrease signaling overhead in the communications because the UE 115 may remain in communication with other devices.

Figure 14:
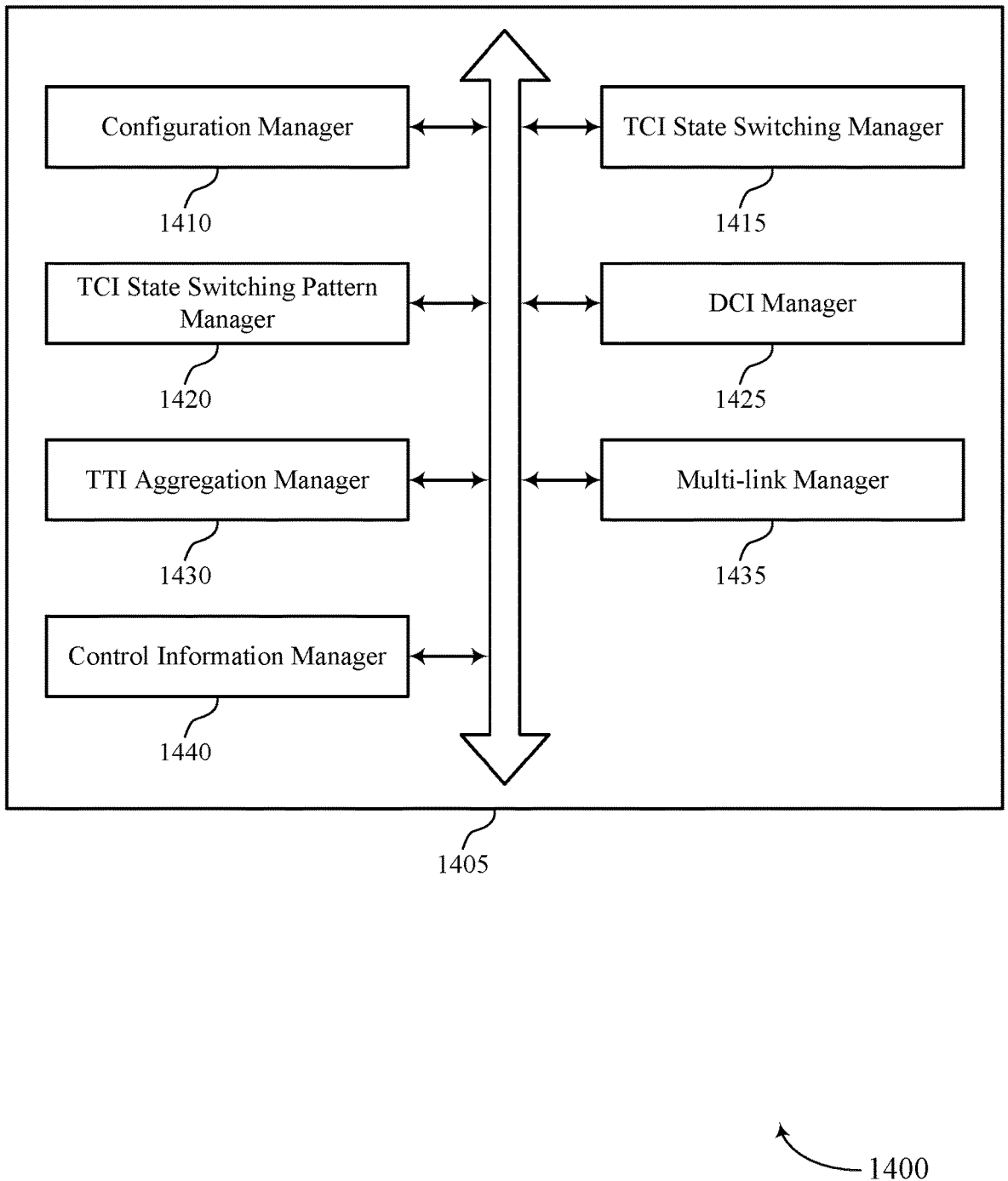
FIG. 14 shows a block diagram of a communications manager that supports semi-static TCI configuration in accordance with aspects of the present disclosure.

FIG. 14 shows a block diagram 1400 of a communications manager 1405 that supports semi-static TCI configuration in accordance with aspects of the present disclosure. The communications manager 1405 may be an example of aspects of a communications manager 1215, a communications manager 1315, or a communications manager 1510 described herein. The communications manager 1405 may include a configuration manager 1410, a TCI state switching manager 1415, a TCI state switching pattern manager 1420, a DCI manager 1425, a TTI aggregation manager 1430, a multi-link manager 1435, and a control information manager 1440. Each of these modules may communicate, directly or indirectly, with one another (e.g., via one or more buses).

The configuration manager 1410 may receive a configuration indicating a TCI state switching pattern and a TCI state switching period, the TCI state switching period indicating a number of a set of TTIs, and the TCI state switching pattern indicating a TCI state for each of the set of TTIs.

In some examples, the configuration manager 1410 may receive a configuration indicating a first TCI state for the UE to use to receive downlink signals. In some examples, the configuration manager 1410 may receive the configuration in RRC signaling that indicates the TCI state switching pattern and the TCI state switching pattern. In some examples, the configuration manager 1410 may receive the configuration in RRC signaling that indicates the first TCI state for the UE to use to receive downlink signals. In some cases, the configuration in the RRC signaling further includes an indication of an aggregation mode and an indication of a number of TTIs aggregated in the TTI aggregation period for the aggregation mode.

The TCI state switching manager 1415 may perform, by the UE, TCI state switching according to the TCI state switching pattern and the TCI state switching period. In some examples, the TCI state switching manager 1415 may switch, responsive to the received DCI signal, to the indicated second TCI state for a second TTI of the set of TTIs aggregated in the TTI aggregation period. In some examples, the TCI state switching manager 1415 may receive a downlink signal in the second TTI according to the second TCI state.

In some examples, the TCI state switching manager 1415 may receive, according to a first TCI state during a first TTI of the TCI state switching pattern, a DCI signal that includes an indication to switch, for a second TTI of the TCI state switching pattern, to a second TCI state different from a TCI state indicated by the TCI state switching pattern for the second TTI. In some examples, the TCI state switching manager 1415 may perform TCI state switching based on the indication to switch of the received DCI signal. In some examples, the TCI state switching manager 1415 may identify a first set of TCI state entries in the TCI state table that correspond to TTIs that are located less than a threshold number of TTIs from the first TTI. In some examples, the TCI state switching manager 1415 may switch to the indicated second TCI state is based on the identified second set of TCI state entries.

In some examples, the TCI state switching manager 1415 may switch to the indicated second TCI state is based on the identified one or more TCI state entries. In some examples, the TCI state switching manager 1415 may perform, prior to receiving the DCI signal indicating the second TCI state, TCI state switching according to a first TCI state switching pattern. In some examples, the TCI state switching manager 1415 may revert, after the predetermined time duration, to performing TCI state switching according to the first TCI state switching pattern based on identifying that a second DCI signal has not been received during the predetermined time duration.

The TCI state switching pattern manager 1420 may receive a downlink transmission during at least one of the set of TTIs of the TCI state switching pattern. In some examples, the TCI state switching pattern manager 1420 may revert, after a time duration, to performing TCI state switching according to the TCI state switching pattern. In some cases, a number of different TCI states in the TCI state switching pattern is equal to a number of TTIs in the set of TTIs of the TCI state switching period. In some cases, the received configuration further indicates a TCI state switching pattern and a TCI state switching period, the TCI state switching period indicating a number of a set of TTIs, and the TCI state switching pattern indicating a TCI state for each of the set of TTIs, including the first TCI state for the first TTI.

The DCI manager 1425 may receive, in a first TTI according to the first TCI state indicated by the received configuration, a DCI signal indicating a second TCI state, the first TTI being one of a set of TTIs aggregated in a TTI aggregation period. In some examples, the DCI manager 1425 may receive, according to a first TCI state during a first TTI of the TCI state switching pattern, a DCI signal that includes a grant of resources for the downlink transmission and an indication to switch, for a second TTI of the TCI state switching pattern, to a second TCI state different from a TCI state indicated by the TCI state switching pattern for the second TTI, where. In some examples, the DCI manager 1425 may receive a DCI signal that indicates a TCI state table. In some examples, the DCI manager 1425 may identify a second set of TCI state entries in the TCI state table that correspond to TTIs that are located more than the threshold number of TTIs away from the first TTI.

In some examples, the DCI manager 1425 may ignore the first set of TCI state entries, where performing TCI state switching is based on the identified second set of TCI state entries. In some examples, the DCI manager 1425 may receive a DCI signal that indicates a TCI state table. In some examples, the DCI manager 1425 may identify one or more TCI state entries in the TCI state table that correspond to TTIs that are more than a threshold number of TTIs from the first TTI, the TCI state table lacking TCI state entries corresponding to TTIs that are less than the threshold number of TTIs from the first TTI, where performing TCI state switching is based on the identified one or more TCI state entries.

In some examples, the DCI manager 1425 may identify a first set of TCI state entries in a TCI state table that is indicated by the received DCI signal, the first set of TCI state entries corresponding to TTIs that are located less than a threshold number of TTIs from the first TTI. In some examples, the DCI manager 1425 may identify a second set of TCI state entries in the TCI state table that correspond to TTIs that are located more than the threshold number of TTIs away from the first TTI. In some examples, the DCI manager 1425 may ignore the first set of TCI state entries, where. In some examples, the DCI manager 1425 may identify one or more TCI state entries in a TCI state table that is indicated by the received DCI signal, the one or more TCI states corresponding to TTIs that are more than a threshold number of TTIs from the first TTI, and the TCI state table lacks TCI state entries corresponding to TTIs that are less than the threshold number of TTIs from the first TTI, where. In some examples, the DCI manager 1425 may perform, for a predetermined time duration, TCI state switching responsive to the received DCI signal. In some cases, the downlink transmission includes a single-TTI transmission.

The TTI aggregation manager 1430 may receive the downlink transmission according to the grant of resources during at least the first TTI according to the first TCI state and during the second TTI according to the second TCI state, where the downlink transmission is aggregated over at least the first TTI and the second TTI. In some cases, the configuration in the RRC signaling further includes an indication of an aggregation mode and an indication of a number of TTIs aggregated in a TTI aggregation period for the aggregation mode.

The multi-link manager 1435 may receive, using the first antenna port according to the first TCI state and using the second antenna port according to the second TCI state, the downlink transmission during at least one of the set of TTIs of the TCI state switching pattern.

The control information manager 1440 may identify a second configuration indicating a second TCI state switching pattern and a second TCI state switching period. In some examples, receiving a downlink control information signal according to the identified second configuration, where the downlink transmission received during the at least one of the set of TTIs of the TCI state switching pattern includes a downlink data transmission.

Figure 15:
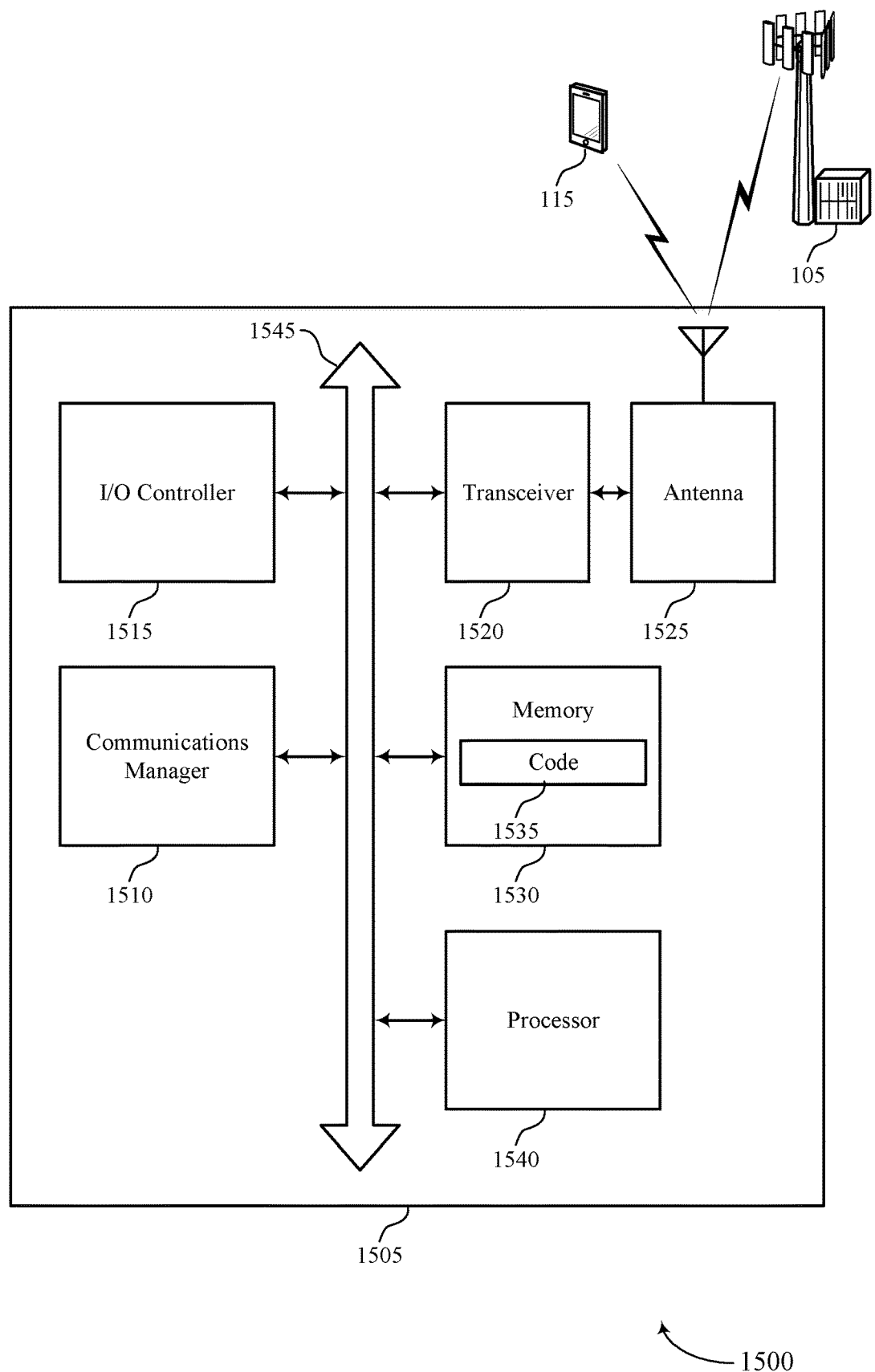
FIG. 15 shows a diagram of a system including a device that supports semi-static TCI configuration in accordance with aspects of the present disclosure.

FIG. 15 shows a diagram of a system 1500 including a device 1505 that supports semi-static TCI configuration in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may receive a configuration indicating a TCI state switching pattern and a TCI state switching period, the TCI state switching period indicating a number of a set of TTIs, and the TCI state switching pattern indicating a TCI state for each of the set of TTIs, perform, by the UE, TCI state switching according to the TCI state switching pattern and the TCI state switching period, and receive a downlink transmission during at least one of the set of TTIs of the TCI state switching pattern. The communications manager 1510 may also receive a configuration indicating a first TCI state for the UE to use to receive downlink signals, receive, in a first TTI according to the first TCI state indicated by the received configuration, a DCI signal indicating a second TCI state, the first TTI being one of a set of TTIs aggregated in a TTI aggregation period, switch, responsive to the received DCI signal, to the indicated second TCI state for a second TTI of the set of TTIs aggregated in the TTI aggregation period, and receive a downlink signal in the second TTI according to the second TCI state.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting semi-static TCI configuration).

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
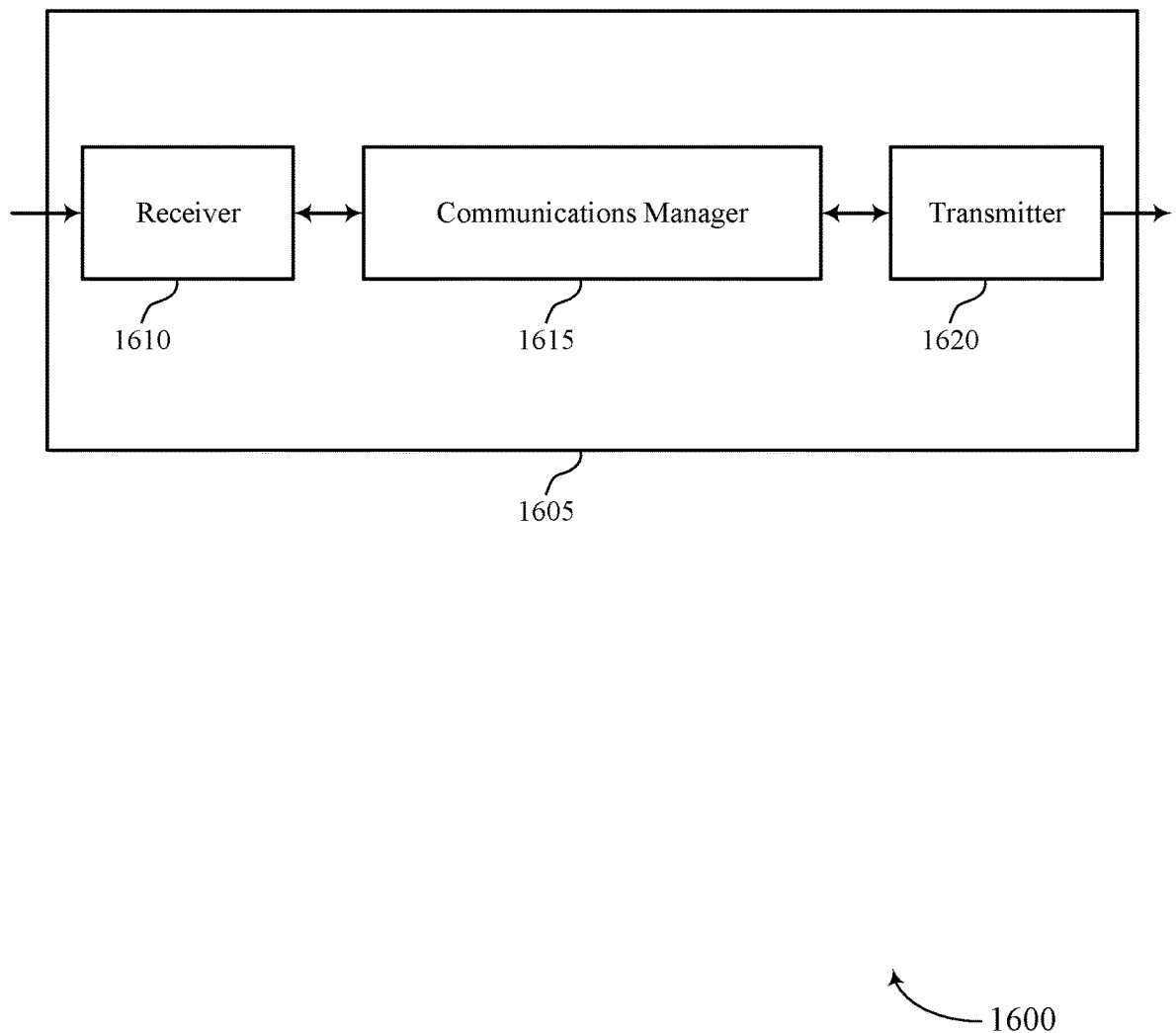
FIGS. 16 and 17 show block diagrams of devices that support semi-static TCI configuration in accordance with aspects of the present disclosure.

FIG. 16 shows a block diagram 1600 of a device 1605 that supports semi-static TCI configuration in accordance with aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to semi-static TCI configuration, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may identify a TCI state switching pattern and a TCI state switching period, the TCI state switching period indicating a number of a set of TTIs, and the TCI state switching pattern indicating a TCI state for each of the set of TTIs, transmit, to a UE, a configuration indicating the identified TCI state switching pattern and the identified TCI state switching period, and transmit a downlink transmission to the UE during at least one of the set of TTIs according to the TCI state switching pattern and the TCI state switching period. The communications manager 1615 may also transmit, to a UE, a configuration indicating a first TCI state for the UE to use to receive downlink signals, transmit, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period, and transmit a downlink signal in the second TTI. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
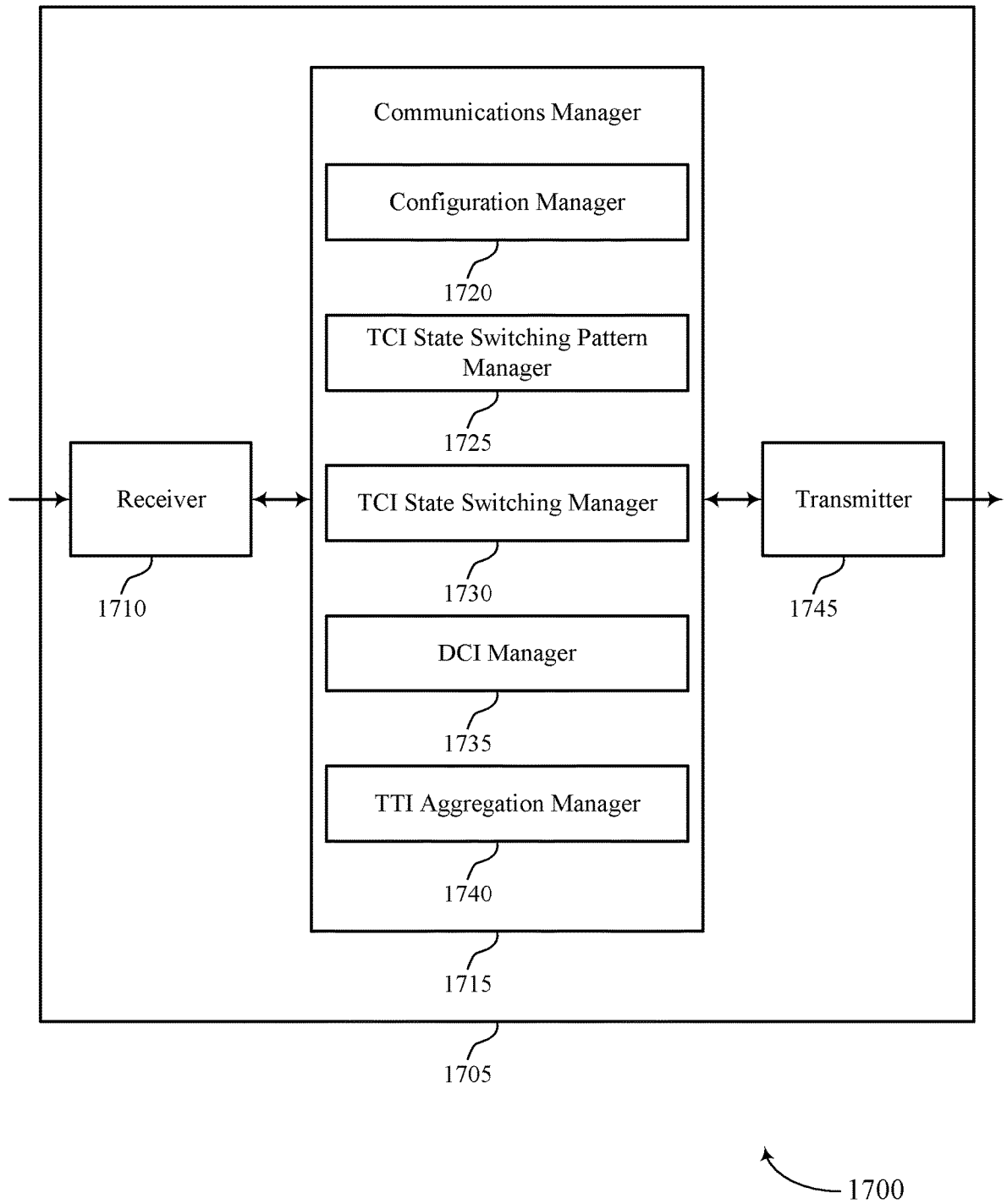

FIG. 17 shows a block diagram 1700 of a device 1705 that supports semi-static TCI configuration in accordance with aspects of the present disclosure. The device 1705 may be an example of aspects of a device 1605, or a base station 105 as described herein. The device 1705 may include a receiver 1710, a communications manager 1715, and a transmitter 1745. The device 1705 may also include a processor. Each of these components may be in communication with one another (e.g., via one or more buses).

The receiver 1710 may receive information such as packets, user data, or control information associated with various information channels (e.g., control channels, data channels, and information related to semi-static TCI configuration, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include a configuration manager 1720, a TCI state switching pattern manager 1725, a TCI state switching manager 1730, a DCI manager 1735, and a TTI aggregation manager 1740. The communications manager 1715 may be an example of aspects of the communications manager 1910 described herein.

The configuration manager 1720 may identify a TCI state switching pattern and a TCI state switching period, the TCI state switching period indicating a number of a set of TTIs, and the TCI state switching pattern indicating a TCI state for each of the set of TTIs and transmit, to a UE, a configuration indicating the identified TCI state switching pattern and the identified TCI state switching period.

The TCI state switching pattern manager 1725 may transmit a downlink transmission to the UE during at least one of the set of TTIs according to the TCI state switching pattern and the TCI state switching period. The TCI state switching manager 1730 may transmit, to a UE, a configuration indicating a first TCI state for the UE to use to receive downlink signals.

The DCI manager 1735 may transmit, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period. The TTI aggregation manager 1740 may transmit a downlink signal in the second TTI.

The transmitter 1745 may transmit signals generated by other components of the device 1705. In some examples, the transmitter 1745 may be collocated with a receiver 1710 in a transceiver module. For example, the transmitter 1745 may be an example of aspects of the transceiver 1920 described with reference to FIG. 19. The transmitter 1745 may utilize a single antenna or a set of antennas.

Figure 18:
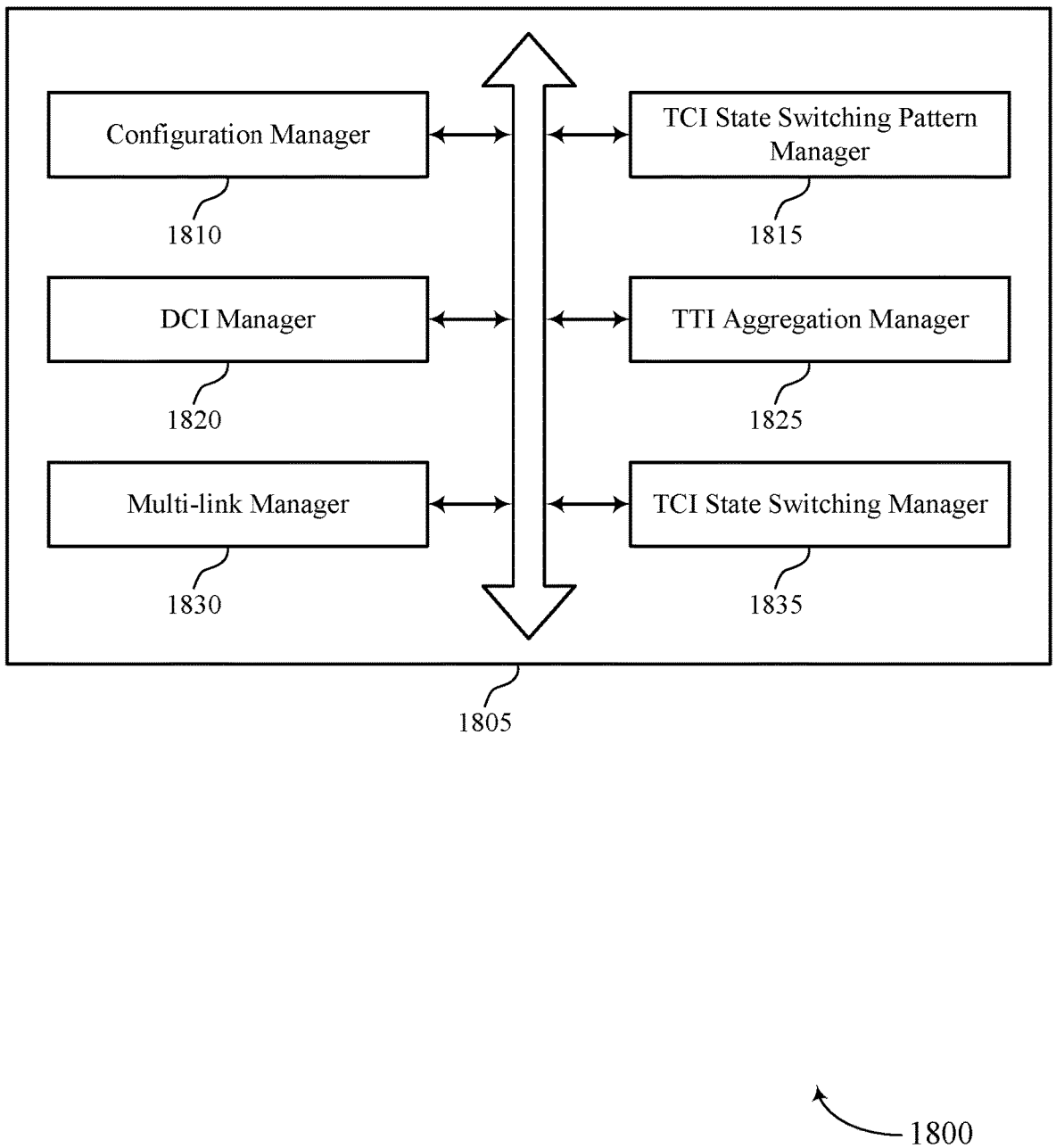
FIG. 18 shows a block diagram of a communications manager that supports semi-static TCI configuration in accordance with aspects of the present disclosure.

FIG. 18 shows a block diagram 1800 of a communications manager 1805 that supports semi-static TCI configuration in accordance with aspects of the present disclosure. The communications manager 1805 may be an example of aspects of a communications manager 1615, a communications manager 1715, or a communications manager 1910 described herein. The communications manager 1805 may include a configuration manager 1810, a TCI state switching pattern manager 1815, a DCI manager 1820, a TTI aggregation manager 1825, a multi-link manager 1830, and a TCI state switching manager 1835. Each of these modules may communicate, directly or indirectly, with one another (e.g., via one or more buses).

The configuration manager 1810 may identify a TCI state switching pattern and a TCI state switching period, the TCI state switching period indicating a number of a set of TTIs, and the TCI state switching pattern indicating a TCI state for each of the set of TTIs. In some examples, the configuration manager 1810 may transmit, to a UE, a configuration indicating the identified TCI state switching pattern and the identified TCI state switching period. In some examples, the configuration manager 1810 may transmit the configuration in RRC signaling that indicates the TCI state switching pattern and the TCI state switching pattern.

In some examples, the configuration manager 1810 may transmit the configuration in RRC signaling that indicates the first TCI state for the UE to use to receive downlink signals. In some cases, the downlink transmission includes a single-TTI transmission. In some cases, the configuration in the RRC signaling further includes an indication of an aggregation mode and an indication of a number of TTIs aggregated in a TTI aggregation period for the aggregation mode. In some cases, the transmitted configuration further indicates a TCI state switching pattern and a TCI state switching period, the TCI state switching period indicating a number of a set of TTIs, and the TCI state switching pattern indicating a TCI state for each of the set of TTIs, including the first TCI state for the first TTI. In some cases, the configuration in the RRC signaling further includes an indication of an aggregation mode and an indication of a number of TTIs aggregated in the TTI aggregation period for the aggregation mode.

The TCI state switching pattern manager 1815 may transmit a downlink transmission to the UE during at least one of the set of TTIs according to the TCI state switching pattern and the TCI state switching period. In some cases, a number of different TCI states in the TCI state switching pattern is equal to a number of TTIs in the set of TTIs of the TCI state switching period.

The DCI manager 1820 may transmit, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period.

In some examples, the DCI manager 1820 may transmit, according to a first TCI state during a first TTI of the TCI state switching pattern, a DCI signal that includes a grant of resources for the downlink transmission and an indication for the UE to switch, for a second TTI of the TCI state switching pattern, to a second TCI state different from a TCI state indicated by the TCI state switching pattern for the second TTI, where. In some examples, transmitting, to the UE, a downlink control information signal according to the identified second configuration, where the downlink transmission transmitted to the UE during the at least one of the set of TTIs according to the TCI state switching pattern and the TCI state switching period includes a downlink data transmission.

In some examples, the DCI manager 1820 may transmit, according to a first TCI state during a first TTI of the TCI state switching pattern, a DCI signal that includes an indication for the UE to switch, for a second TTI of the TCI state switching pattern, to a second TCI state different from a TCI state indicated by the TCI state switching pattern for the second TTI, and for the UE to revert, after a time duration, to performing TCI state switching according to the TCI state switching pattern. In some examples, the DCI manager 1820 may transmit a DCI signal that indicates a TCI state table, the TCI including a first set of TCI state entries that correspond to TTIs that are located less than a threshold number of TTIs from the first TTI, and including a second set of TCI state entries that correspond to TTIs that are located more than the threshold number of TTIs away from the first TTI, the UE to ignore the first set of TCI state entries when performing TCI state switching based on the identified second set of TCI state entries.

In some examples, the DCI manager 1820 may transmit a DCI signal that indicates a TCI state table, one or more TCI state entries in the TCI state table corresponding to TTIs that are more than a threshold number of TTIs from the first TTI, and the TCI state table lacking TCI state entries corresponding to TTIs that are less than the threshold number of TTIs from the first TTI. In some examples, the DCI manager 1820 may identify a first set of TCI state entries for a TCI state table, the first set of TCI state entries corresponding to TTIs that are located less than a threshold number of TTIs from the first TTI. In some examples, the DCI manager 1820 may identify a second set of TCI state entries for the TCI state table that correspond to TTIs that are located more than the threshold number of TTIs away from the first TTI.

In some examples, the DCI manager 1820 may transmit, to the UE, an indication of the TCI state table in the DCI signal, the UE to ignore the first set of TCI state entries when switching to the indicated second TCI state based on the second set of TCI state entries. In some examples, the DCI manager 1820 may transmit, to the UE, an indication of the TCI state table in the DCI signal.

The TTI aggregation manager 1825 may transmit a downlink signal in the second TTI. In some examples, the TTI aggregation manager 1825 may transmit the downlink transmission according to the grant of resources during at least the first TTI according to the first TCI state and during the second TTI according to the second TCI state, where the downlink transmission is aggregated over at least the first TTI and the second TTI.

The TCI state switching manager 1835 may transmit, to a UE, a configuration indicating a first TCI state for the UE to use to receive downlink signals. In some examples, the TCI state switching manager 1835 may identify a second configuration indicating a second TCI state switching pattern and a second TCI state switching period. In some examples, the TCI state switching manager 1835 may transmit, to the UE, an indication of the second configuration. In some examples, the TCI state switching manager 1835 may identify one or more TCI state entries for a TCI state table, the one or more TCI states corresponding to TTIs that are more than a threshold number of TTIs from the first TTI, the TCI state table lacking TCI state entries corresponding to TTIs that are less than the threshold number of TTIs from the first TTI. In some examples, the TCI state switching manager 1835 may transmit an indication for the UE to revert, after a predetermined time duration, to performing TCI state switching according to a first TCI state switching pattern based on identifying that a second DCI signal has not been received during the predetermined time duration.

The multi-link manager 1830 may configure a TCI state switching pattern that includes a first TCI state associated with a first antenna port for each of the plurality of TTIs and a second TCI state associated with a second antenna port for each of the plurality of TTIs, so that the UE may receive the downlink transmission using the first antenna port according to the first TCI state and using the second antenna port according to the second TCI state, the downlink transmission during at least one of the plurality of TTIs of the TCI state switching pattern. In some cases, the TCI state switching pattern includes a first TCI state associated with a first antenna port for each of the set of TTIs and a second TCI state associated with a second antenna port for each of the set of TTIs, the UE to receive the downlink transmission using the first antenna port according to the first TCI state and using the second antenna port according to the second TCI state, the downlink transmission during at least one of the set of TTIs of the TCI state switching pattern.

Figure 19:
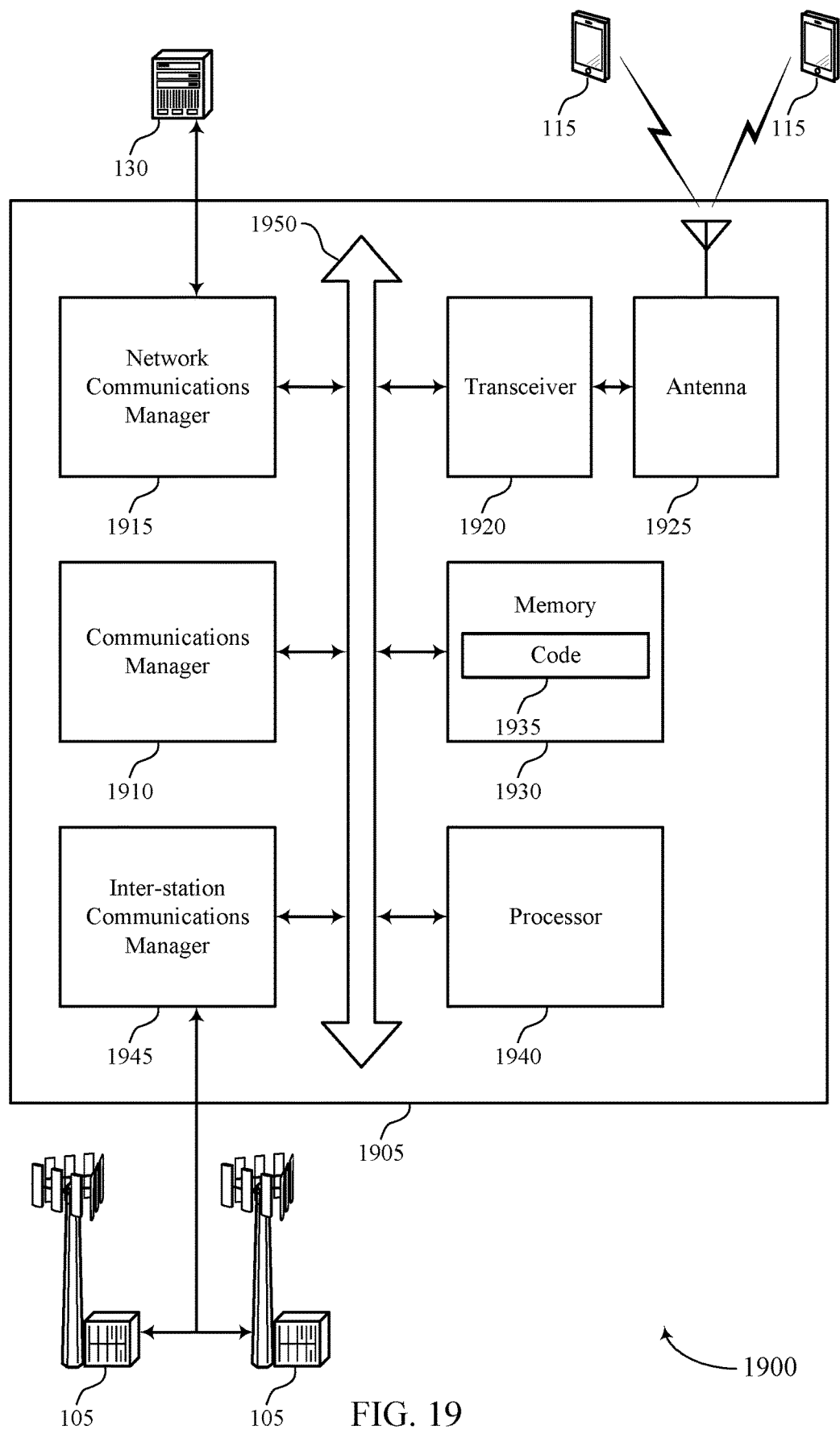
FIG. 19 shows a diagram of a system including a device that supports semi-static TCI configuration in accordance with aspects of the present disclosure.

FIG. 19 shows a diagram of a system 1900 including a device 1905 that supports semi-static TCI configuration in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may identify a TCI state switching pattern and a TCI state switching period, the TCI state switching period indicating a number of a set of TTIs, and the TCI state switching pattern indicating a TCI state for each of the set of TTIs, transmit, to a UE, a configuration indicating the identified TCI state switching pattern and the identified TCI state switching period, and transmit a downlink transmission to the UE during at least one of the set of TTIs according to the TCI state switching pattern and the TCI state switching period. The communications manager 1910 may also transmit, to a UE, a configuration indicating a first TCI state for the UE to use to receive downlink signals, transmit, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period, and transmit a downlink signal in the second TTI.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described herein. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting semi-static TCI configuration).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
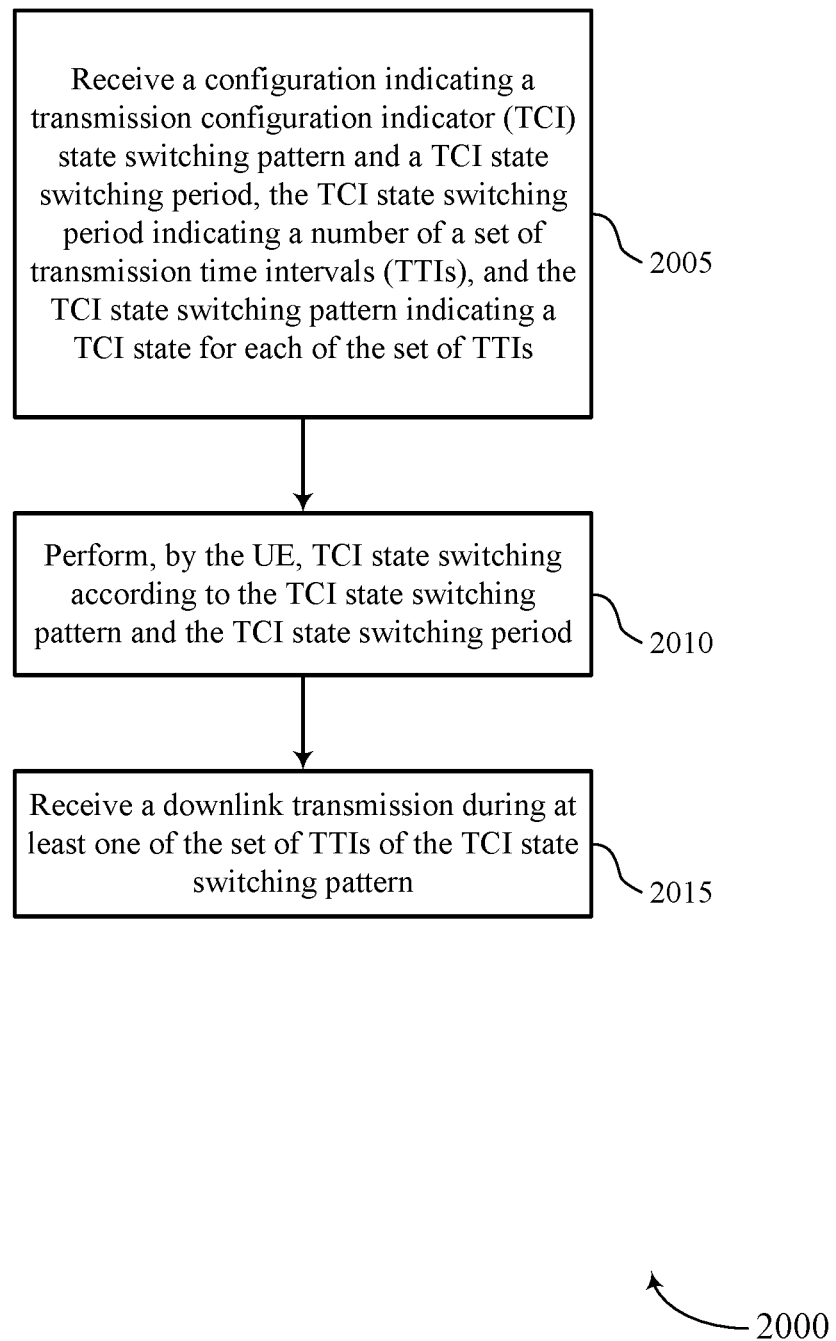
FIGS. 20 through 25 show flowcharts illustrating methods that support semi-static TCI configuration in accordance with aspects of the present disclosure.

FIG. 20 shows a flowchart illustrating a method 2000 that supports semi-static TCI configuration in accordance with aspects of the present disclosure. The operations of method 2000 may be implemented by a UE 115 or its components as described herein. For example, the operations of method 2000 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2005, the UE may receive a configuration indicating a TCI state switching pattern and a TCI state switching period, the TCI state switching period indicating a number of a set of TTIs, and the TCI state switching pattern indicating a TCI state for each of the set of TTIs. The operations of 2005 may be performed according to the methods described herein. In some examples, aspects of the operations of 2005 may be performed by a configuration manager as described with reference to FIGS. 12 through 15.

At 2010, the UE may perform, by the UE, TCI state switching according to the TCI state switching pattern and the TCI state switching period. The operations of 2010 may be performed according to the methods described herein. In some examples, aspects of the operations of 2010 may be performed by a TCI state switching manager as described with reference to FIGS. 12 through 15.

At 2015, the UE may receive a downlink transmission during at least one of the set of TTIs of the TCI state switching pattern. The operations of 2015 may be performed according to the methods described herein. In some examples, aspects of the operations of 2015 may be performed by a TCI state switching pattern manager as described with reference to FIGS. 12 through 15.

Figure 21:
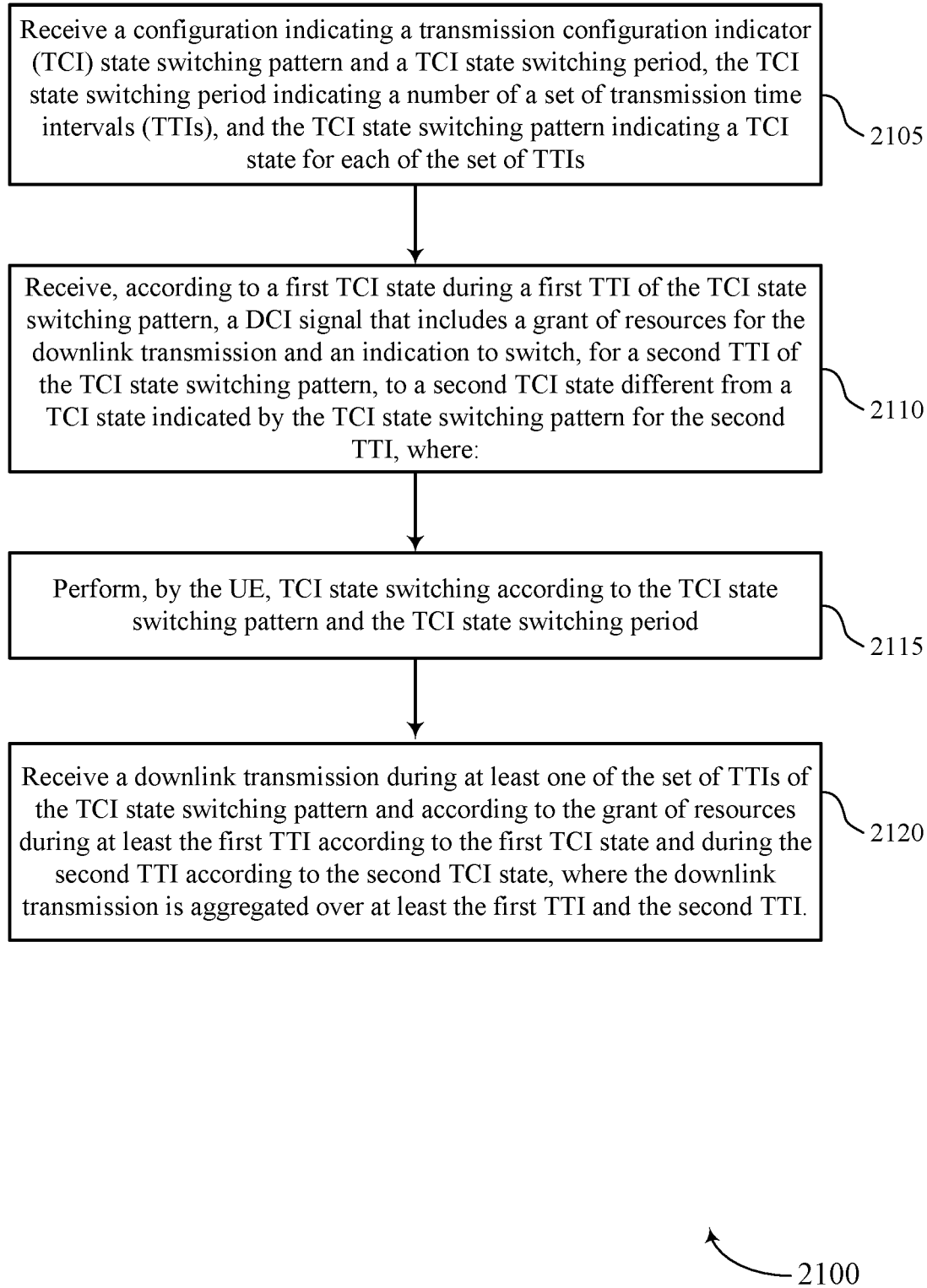

FIG. 21 shows a flowchart illustrating a method 2100 that supports semi-static TCI configuration in accordance with aspects of the present disclosure. The operations of method 2100 may be implemented by a UE 115 or its components as described herein. For example, the operations of method 2100 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2105, the UE may receive a configuration indicating a TCI state switching pattern and a TCI state switching period, the TCI state switching period indicating a number of a set of TTIs, and the TCI state switching pattern indicating a TCI state for each of the set of TTIs. The operations of 2105 may be performed according to the methods described herein. In some examples, aspects of the operations of 2105 may be performed by a configuration manager as described with reference to FIGS. 12 through 15.

At 2110, the UE may receive, according to a first TCI state during a first TTI of the TCI state switching pattern, a DCI signal that includes a grant of resources for the downlink transmission and an indication to switch, for a second TTI of the TCI state switching pattern, to a second TCI state different from a TCI state indicated by the TCI state switching pattern for the second TTI, where. The operations of 2110 may be performed according to the methods described herein. In some examples, aspects of the operations of 2110 may be performed by a DCI manager as described with reference to FIGS. 12 through 15.

At 2115, the UE may perform, by the UE, TCI state switching according to the TCI state switching pattern and the TCI state switching period. The operations of 2115 may be performed according to the methods described herein. In some examples, aspects of the operations of 2115 may be performed by a TCI state switching manager as described with reference to FIGS. 12 through 15.

At 2120, the UE may receive a downlink transmission during at least one of the set of TTIs of the TCI state switching pattern. The operations of 2120 may be performed according to the methods described herein and according to the grant of resources during at least the first TTI according to the first TCI state and during the second TTI according to the second TCI state, where the downlink transmission is aggregated over at least the first TTI and the second TTI. In some examples, aspects of the operations of 2120 may be performed by a TCI state switching pattern manager as described with reference to FIGS. 12 through 15.

Figure 22:
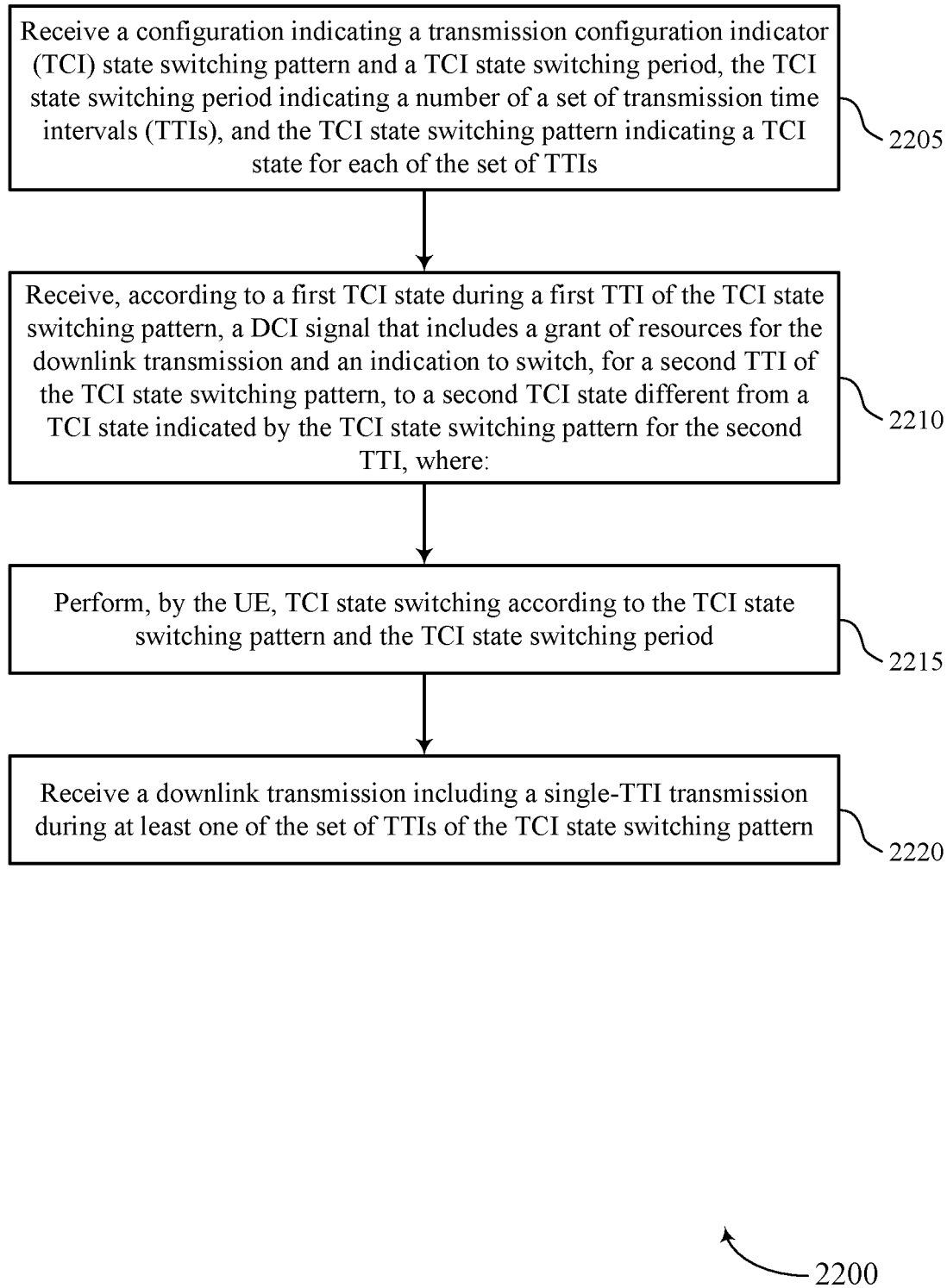

FIG. 22 shows a flowchart illustrating a method 2200 that supports semi-static TCI configuration in accordance with aspects of the present disclosure. The operations of method 2200 may be implemented by a UE 115 or its components as described herein. For example, the operations of method 2200 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2205, the UE may receive a configuration indicating a TCI state switching pattern and a TCI state switching period, the TCI state switching period indicating a number of a set of TTIs, and the TCI state switching pattern indicating a TCI state for each of the set of TTIs. The operations of 2205 may be performed according to the methods described herein. In some examples, aspects of the operations of 2205 may be performed by a configuration manager as described with reference to FIGS. 12 through 15.

At 2210, the UE may receive, according to a first TCI state during a first TTI of the TCI state switching pattern, a DCI signal that includes a grant of resources for the downlink transmission and an indication to switch, for a second TTI of the TCI state switching pattern, to a second TCI state different from a TCI state indicated by the TCI state switching pattern for the second TTI, where. The operations of 2210 may be performed according to the methods described herein. In some examples, aspects of the operations of 2210 may be performed by a DCI manager as described with reference to FIGS. 12 through 15.

At 2215, the UE may perform, by the UE, TCI state switching according to the TCI state switching pattern and the TCI state switching period. The operations of 2215 may be performed according to the methods described herein. In some examples, aspects of the operations of 2215 may be performed by a TCI state switching manager as described with reference to FIGS. 12 through 15.

At 2220, the UE may receive a downlink transmission including a single-TTI transmission during at least one of the set of TTIs of the TCI state switching pattern. The operations of 2220 may be performed according to the methods described herein. In some examples, aspects of the operations of 2220 may be performed by a TCI state switching pattern manager as described with reference to FIGS. 12 through 15.

Figure 23:
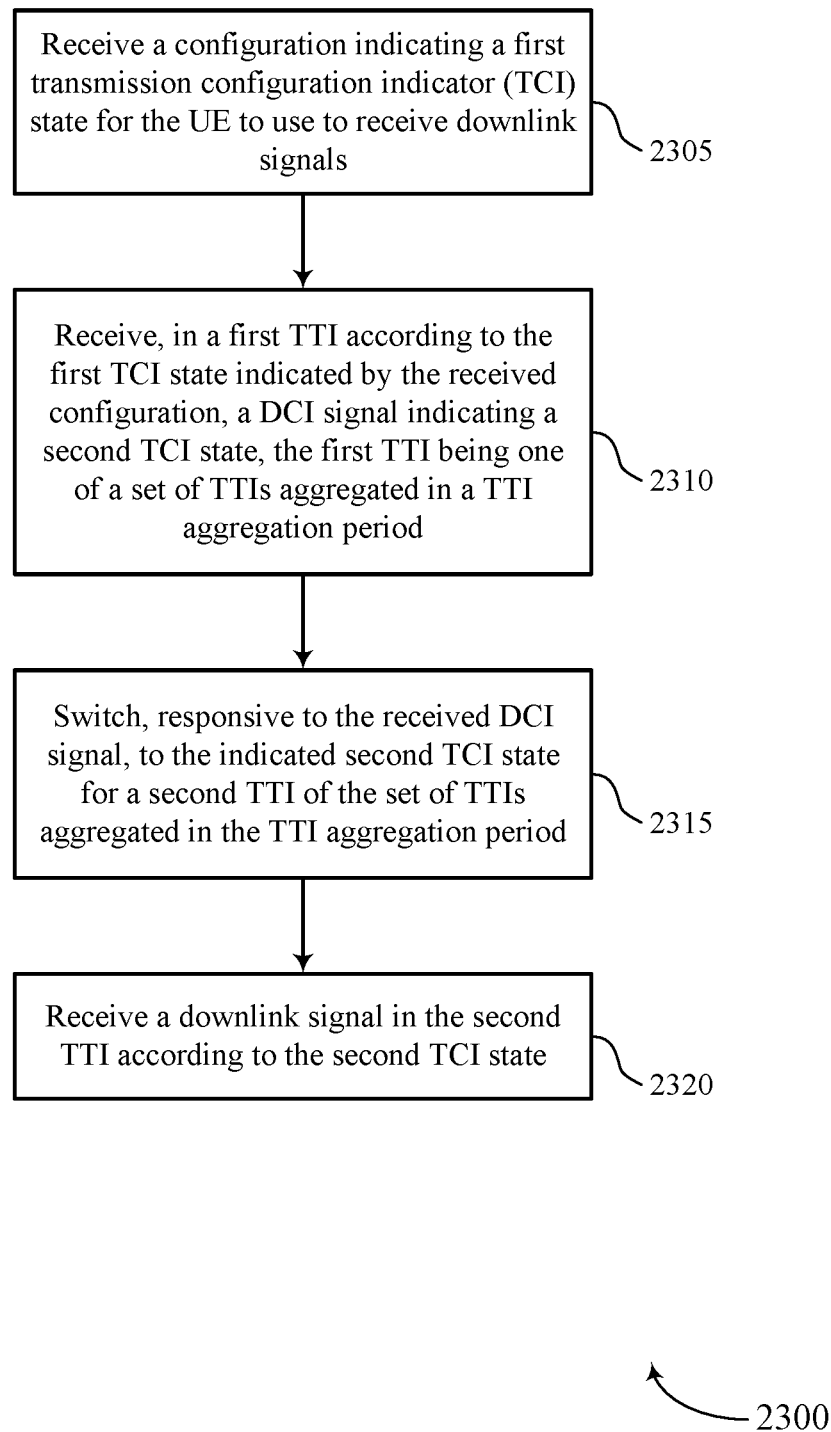

FIG. 23 shows a flowchart illustrating a method 2300 that supports semi-static TCI configuration in accordance with aspects of the present disclosure. The operations of method 2300 may be implemented by a UE 115 or its components as described herein. For example, the operations of method 2300 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2305, the UE may receive a configuration indicating a first TCI state for the UE to use to receive downlink signals. The operations of 2305 may be performed according to the methods described herein. In some examples, aspects of the operations of 2305 may be performed by a configuration manager as described with reference to FIGS. 12 through 15.

At 2310, the UE may receive, in a first TTI according to the first TCI state indicated by the received configuration, a DCI signal indicating a second TCI state, the first TTI being one of a set of TTIs aggregated in a TTI aggregation period. The operations of 2310 may be performed according to the methods described herein. In some examples, aspects of the operations of 2310 may be performed by a DCI manager as described with reference to FIGS. 12 through 15.

At 2315, the UE may switch, responsive to the received DCI signal, to the indicated second TCI state for a second TTI of the set of TTIs aggregated in the TTI aggregation period. The operations of 2315 may be performed according to the methods described herein. In some examples, aspects of the operations of 2315 may be performed by a TCI state switching manager as described with reference to FIGS. 12 through 15.

At 2320, the UE may receive a downlink signal in the second TTI according to the second TCI state. The operations of 2320 may be performed according to the methods described herein. In some examples, aspects of the operations of 2320 may be performed by a TCI state switching manager as described with reference to FIGS. 12 through 15.

Figure 24:
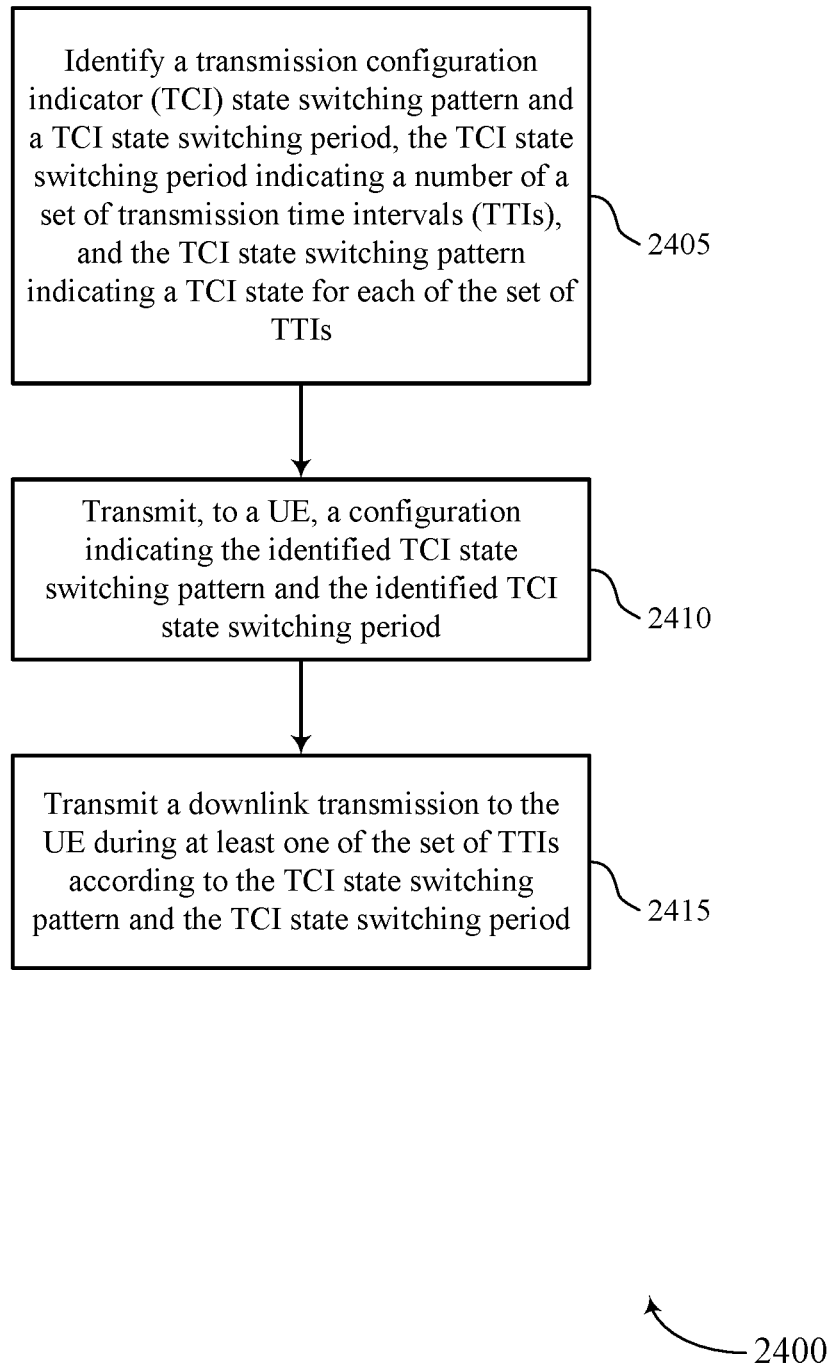

FIG. 24 shows a flowchart illustrating a method 2400 that supports semi-static TCI configuration in accordance with aspects of the present disclosure. The operations of method 2400 may be implemented by a base station 105 or its components as described herein. For example, the operations of method 2400 may be performed by a communications manager as described with reference to FIGS. 16 through 19. In some examples, a base station may execute a set of instructions to control the functional elements of the base station to perform the functions described herein. Additionally or alternatively, a base station may perform aspects of the functions described herein using special-purpose hardware.

At 2405, the base station may identify a TCI state switching pattern and a TCI state switching period, the TCI state switching period indicating a number of a set of TTIs, and the TCI state switching pattern indicating a TCI state for each of the set of TTIs. The operations of 2405 may be performed according to the methods described herein. In some examples, aspects of the operations of 2405 may be performed by a configuration manager as described with reference to FIGS. 16 through 19.

At 2410, the base station may transmit, to a UE, a configuration indicating the identified TCI state switching pattern and the identified TCI state switching period. The operations of 2410 may be performed according to the methods described herein. In some examples, aspects of the operations of 2410 may be performed by a configuration manager as described with reference to FIGS. 16 through 19.

At 2415, the base station may transmit a downlink transmission to the UE during at least one of the set of TTIs according to the TCI state switching pattern and the TCI state switching period. The operations of 2415 may be performed according to the methods described herein. In some examples, aspects of the operations of 2415 may be performed by a TCI state switching pattern manager as described with reference to FIGS. 16 through 19.

Figure 25:
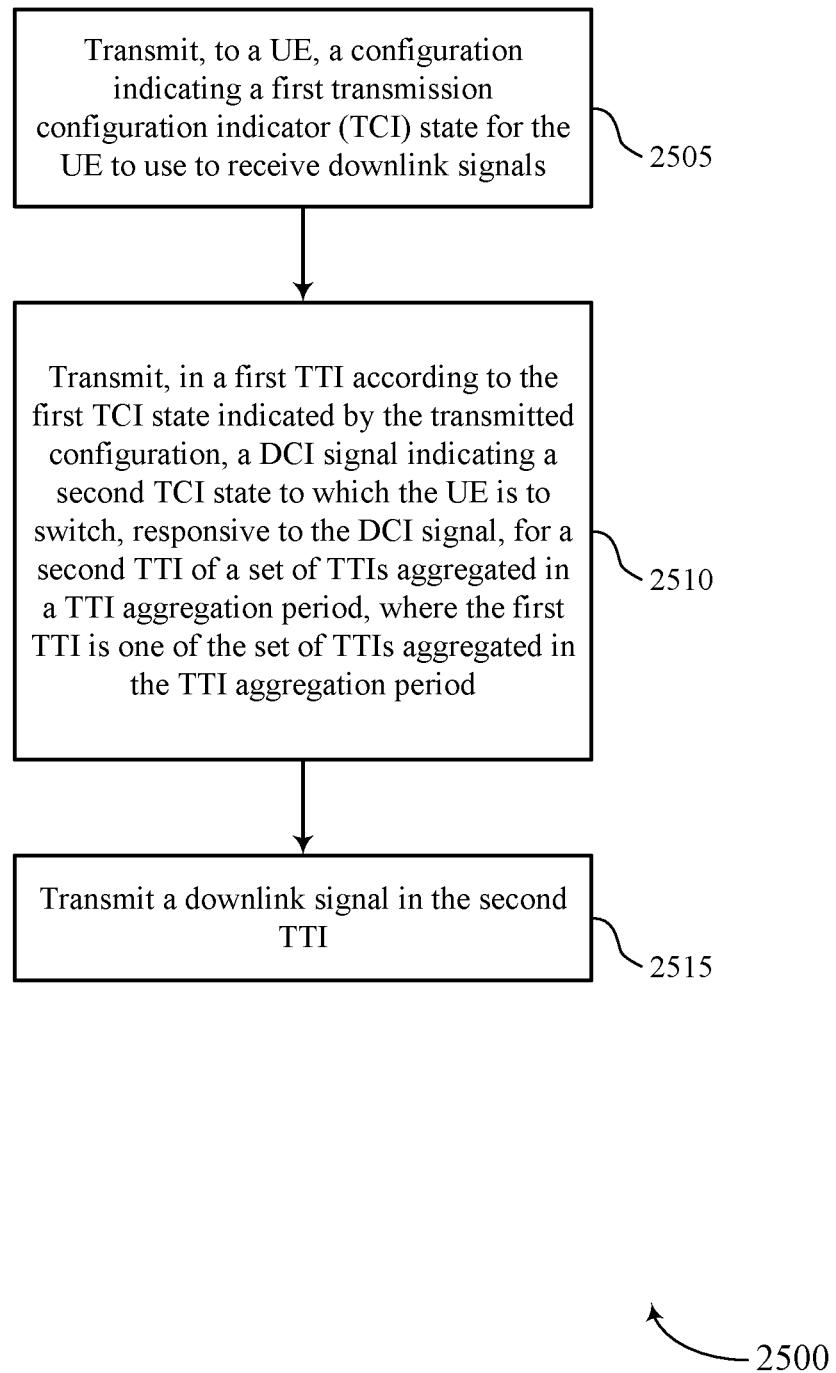

FIG. 25 shows a flowchart illustrating a method 2500 that supports semi-static TCI configuration in accordance with aspects of the present disclosure. The operations of method 2500 may be implemented by a base station 105 or its components as described herein. For example, the operations of method 2500 may be performed by a communications manager as described with reference to FIGS. 16 through 19. In some examples, a base station may execute a set of instructions to control the functional elements of the base station to perform the functions described herein. Additionally or alternatively, a base station may perform aspects of the functions described herein using special-purpose hardware.

At 2505, the base station may transmit, to a UE, a configuration indicating a first TCI state for the UE to use to receive downlink signals. The operations of 2505 may be performed according to the methods described herein. In some examples, aspects of the operations of 2505 may be performed by a TCI state switching manager as described with reference to FIGS. 16 through 19.

At 2510, the base station may transmit, in a first TTI according to the first TCI state indicated by the transmitted configuration, a DCI signal indicating a second TCI state to which the UE is to switch, responsive to the DCI signal, for a second TTI of a set of TTIs aggregated in a TTI aggregation period, where the first TTI is one of the set of TTIs aggregated in the TTI aggregation period. The operations of 2510 may be performed according to the methods described herein. In some examples, aspects of the operations of 2510 may be performed by a DCI manager as described with reference to FIGS. 16 through 19.

At 2515, the base station may transmit a downlink signal in the second TTI. The operations of 2515 may be performed according to the methods described herein. In some examples, aspects of the operations of 2515 may be performed by a TTI aggregation manager as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration message indicating a transmission configuration indicator (TCI) state switching pattern, the TCI state switching pattern associated with a TCI state switching period comprising a plurality of transmission time intervals (TTIs), and the TCI state switching pattern indicating a TCI state for each of the plurality of TTIs;
   performing TCI state switching according to the TCI state switching pattern and the TCI state switching period; and
   receiving a downlink transmission during at least one of the plurality of TTIs of the TCI state switching pattern.

2. The method of claim 1, further comprising:
   receiving, according to a first TCI state during a first TTI of the TCI state switching pattern, a downlink control information (DCI) signal that includes a grant of resources for the downlink transmission and an indication to switch, for a second TTI of the TCI state switching pattern, to a second TCI state different from a TCI state indicated by the TCI state switching pattern for the second TTI; and
   receiving the downlink transmission comprises receiving the downlink transmission according to the grant of resources at least during the second TTI according to the second TCI state.

3. The method of claim 2, wherein receiving the downlink transmission comprises:
   receiving the downlink transmission according to the grant of resources during at least the first TTI according to the first TCI state and during the second TTI according to the second TCI state, wherein the downlink transmission is aggregated over at least the first TTI and the second TTI.

4. The method of claim 2, wherein the downlink transmission comprises a single-TTI transmission.

5. The method of claim 1, wherein the TCI state switching pattern comprises a first TCI state associated with a first antenna port for each of the plurality of TTIs and a second TCI state associated with a second antenna port for each of the plurality of TTIs, and wherein receiving the downlink transmission comprises:
   receiving, using the first antenna port according to the first TCI state and using the second antenna port according to the second TCI state, the downlink transmission during at least one of the plurality of TTIs of the TCI state switching pattern.

6. The method of claim 1, further comprising:
   identifying a second configuration indicating a second TCI state switching pattern, the second TCI state switching pattern associated with a second TCI state switching period; and
   receiving a downlink control information signal according to the identified second configuration, wherein the downlink transmission received during the at least one of the plurality of TTIs of the TCI state switching pattern comprises a downlink data transmission.

7. The method of claim 1, wherein receiving the configuration message comprises:
   receiving the configuration message in radio resource control (RRC) signaling that indicates the TCI state switching pattern.

8. The method of claim 7, wherein the configuration message in the RRC signaling further comprises an indication of an aggregation mode and an indication of a number of TTIs aggregated in a TTI aggregation period for the aggregation mode.

9. The method of claim 1, further comprising:
   receiving, according to a first TCI state during a first TTI of the TCI state switching pattern, a downlink control information (DCI) signal that includes an indication to switch, for a second TTI of the TCI state switching pattern, to a second TCI state different from a TCI state indicated by the TCI state switching pattern for the second TTI;
performing TCI state switching based at least in part on the indication to switch of the received DCI signal; and
reverting, after a time duration, to performing TCI state switching according to the TCI state switching pattern.

10. The method of claim 1, further comprising:
receiving a downlink control information (DCI) signal that indicates a TCI state table;
identifying a first set of TCI state entries in the TCI state table that correspond to TTIs that are located less than a threshold number of TTIs from the first TTI;
identifying a second set of TCI state entries in the TCI state table that correspond to TTIs that are located more than the threshold number of TTIs away from the first TTI; and
ignoring the first set of TCI state entries, wherein performing TCI state switching is based at least in part on the identified second set of TCI state entries.

11. The method of claim 1, further comprising:
receiving a DCI signal that indicates a TCI state table; and
identify one or more TCI state entries in the TCI state table that correspond to TTIs that are more than a threshold number of TTIs from the first TTI, the TCI state table lacking TCI state entries corresponding to TTIs that are less than the threshold number of TTIs from the first TTI, wherein performing TCI state switching is based at least in part on the identified one or more TCI state entries.

12. The method of claim 1, wherein a number of different TCI states in the TCI state switching pattern is equal to a number of TTIs in the plurality of TTIs of the TCI state switching period.

13. The method of claim 1, further comprising:
receiving, in a first TTI according to the first TCI state indicated by the received configuration message, a downlink control information (DCI) signal indicating a second TCI state, the first TTI being one of a plurality of TTIs aggregated in a TTI aggregation period;
switching, responsive to the received DCI signal, to the indicated second TCI state for a second TTI of the plurality of TTIs aggregated in the TTI aggregation period; and
receiving a downlink signal in the second TTI according to the second TCI state.

14. The method of claim 13, wherein the TCI state switching pattern indicating a TCI state for each of the plurality of TTIs includes the first TCI state for the first TTI.

15. The method of claim 13, further comprising:
identifying a first set of TCI state entries in a TCI state table that is indicated by the received DCI signal, the first set of TCI state entries corresponding to TTIs that are located less than a threshold number of TTIs from the first TTI;
identifying a second set of TCI state entries in the TCI state table that correspond to TTIs that are located more than the threshold number of TTIs away from the first TTI;
ignoring the first set of TCI state entries; and
switching to the indicated second TCI state is based at least in part on the identified second set of TCI state entries.

16. The method of claim 13, further comprising:
identifying one or more TCI state entries in a TCI state table that is indicated by the received DCI signal, the one or more TCI states corresponding to TTIs that are more than a threshold number of TTIs from the first TTI, and the TCI state table lacks TCI state entries corresponding to TTIs that are less than the threshold number of TTIs from the first TTI; and
switching to the indicated second TCI state is based at least in part on the identified one or more TCI state entries.

17. The method of claim 13, further comprising:
performing, prior to receiving the DCI signal indicating the second TCI state, TCI state switching according to a first TCI state switching pattern;
performing, for a predetermined time duration, TCI state switching responsive to the received DCI signal; and
reverting, after the predetermined time duration, to performing TCI state switching according to the first TCI state switching pattern based at least in part on identifying that a second DCI signal has not been received during the predetermined time duration.

18. A method for wireless communication at a base station, comprising:
identifying a transmission configuration indicator (TCI) state switching pattern, the TCI state switching pattern associated with a TCI state switching period indicating a number of a plurality of transmission time intervals (TTIs), and the TCI state switching pattern indicating a TCI state for each of the plurality of TTIs;
transmitting, to a user equipment (UE), a configuration message indicating the identified TCI state switching pattern; and
transmitting a downlink transmission to the UE during at least one of the plurality of TTIs according to the TCI state switching pattern and the TCI state switching period.

19. The method of claim 18, further comprising:
transmitting, according to a first TCI state during a first TTI of the TCI state switching pattern, a downlink control information (DCI) signal that includes a grant of resources for the downlink transmission and an indication for the UE to switch, for a second TTI of the TCI state switching pattern, to a second TCI state different from a TCI state indicated by the TCI state switching pattern for the second TTI; and
transmitting the downlink transmission comprises transmitting the downlink transmission according to the grant of resources at least during the second TTI according to the second TCI state.

20. The method of claim 19, wherein transmitting the downlink transmission comprises:
transmitting the downlink transmission according to the grant of resources during at least the first TTI according to the first TCI state and during the second TTI according to the second TCI state, wherein the downlink transmission is aggregated over at least the first TTI and the second TTI.

21. The method of claim 18, further comprising:
identifying a second configuration indicating a second TCI state switching pattern associated with a second TCI state switching period;
transmitting, to the UE, an indication of the second configuration; and
transmitting, to the UE, a downlink control information signal according to the identified second configuration, wherein the downlink transmission transmitted to the UE during the at least one of the plurality of TTIs according to the TCI state switching pattern and the TCI state switching period comprises a downlink data transmission.

22. The method of claim 18, wherein transmitting the configuration message comprises:
transmitting the configuration message in radio resource control (RRC) signaling that indicates the TCI state switching pattern.

23. The method of claim 18, further comprising:
transmitting, according to a first TCI state during a first TTI of the TCI state switching pattern, a downlink control information (DCI) signal that includes an indication for the UE to switch, for a second TTI of the TCI state switching pattern, to a second TCI state different from a TCI state indicated by the TCI state switching pattern for the second TTI, and for the UE to revert, after a time duration, to performing TCI state switching according to the TCI state switching pattern.

24. The method of claim 18, further comprising:
transmitting a DCI signal that indicates a TCI state table, the TCI including a first set of TCI state entries that correspond to TTIs that are located less than a threshold number of TTIs from the first TTI, and including a second set of TCI state entries that correspond to TTIs that are located more than the threshold number of TTIs away from the first TTI, the UE to ignore the first set of TCI state entries when performing TCI state switching based at least in part on the identified second set of TCI state entries.

25. The method of claim 18, further comprising:
transmitting a DCI signal that indicates a TCI state table, one or more TCI state entries in the TCI state table corresponding to TTIs that are more than a threshold number of TTIs from the first TTI, and the TCI state table lacking TCI state entries corresponding to TTIs that are less than the threshold number of TTIs from the first TTI.

26. The method of claim 18, comprising:
transmitting, in a first TTI according to the first TCI state indicated by the transmitted configuration message, a downlink control information (DCI) signal indicating a second TCI state to which the UE is to switch, responsive to the DCI signal, for a second TTI of a plurality of TTIs aggregated in a TTI aggregation period, wherein the first TTI is one of the plurality of TTIs aggregated in the TTI aggregation period; and
transmitting a downlink signal in the second TTI.

27. The method of claim 26, further comprising:
identifying a first set of TCI state entries for a TCI state table, the first set of TCI state entries corresponding to TTIs that are located less than a threshold number of TTIs from the first TTI;
identifying a second set of TCI state entries for the TCI state table that correspond to TTIs that are located more than the threshold number of TTIs away from the first TTI; and
transmitting, to the UE, an indication of the TCI state table in the DCI signal, the UE to ignore the first set of TCI state entries when switching to the indicated second TCI state based at least in part on the second set of TCI state entries.

28. The method of claim 26, further comprising:
identifying one or more TCI state entries for a TCI state table, the one or more TCI states corresponding to TTIs that are more than a threshold number of TTIs from the first TTI, the TCI state table lacking TCI state entries corresponding to TTIs that are less than the threshold number of TTIs from the first TTI; and
transmitting, to the UE, an indication of the TCI state table in the DCI signal.

29. An apparatus for wireless communication at a user equipment (UE), comprising:
a processor,
memory in electronic communication with the processor; and
instructions stored in the memory and executable by the processor to cause the apparatus to:
receive a configuration message indicating a transmission configuration indicator (TCI) state switching pattern, the TCI state switching pattern associated with a TCI state switching period comprising a plurality of transmission time intervals (TTIs), and the TCI state switching pattern indicating a TCI state for each of the plurality of TTIs;
perform TCI state switching according to the TCI state switching pattern and the TCI state switching period; and
receive a downlink transmission during at least one of the plurality of TTIs of the TCI state switching pattern.

30. An apparatus for wireless communication at a base station, comprising:
a processor,
memory in electronic communication with the processor; and
instructions stored in the memory and executable by the processor to cause the apparatus to:
identify a transmission configuration indicator (TCI) state switching pattern, the TCI state switching pattern associated with a TCI state switching period indicating a number of a plurality of transmission time intervals (TTIs), and the TCI state switching pattern indicating a TCI state for each of the plurality of TTIs;
transmit, to a user equipment (UE), a configuration message indicating the identified TCI state switching pattern; and
transmit a downlink transmission to the UE during at least one of the plurality of TTIs according to the TCI state switching pattern and the TCI state switching period.

* * * * *